US012732628B2

(12) United States Patent
Ye et al.

(10) Patent No.: US 12,732,628 B2
(45) Date of Patent: Sep. 8, 2026

(54) IMAGE DECODING METHOD AND APPARATUS, IMAGE CODING METHOD AND APPARATUS, AND DEVICE AND STORAGE MEDIUM

(71) Applicant: HANGZHOU HIKVISION DIGITAL TECHNOLOGY CO., LTD., Hangzhou (CN)

(72) Inventors: Zongmiao Ye, Hangzhou (CN); Fangdong Chen, Hangzhou (CN); Li Wang, Hangzhou (CN); Xiaoyang Wu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/470,611

(22) PCT Filed: Mar. 29, 2024

(86) PCT No.: PCT/CN2024/084961

§ 371 (c)(1),
(2) Date: Sep. 29, 2025

(87) PCT Pub. No.: WO2024/199477

PCT Pub. Date: Oct. 3, 2024

(65) Prior Publication Data

US 2026/0122263 A1 Apr. 30, 2026

(30) Foreign Application Priority Data

Mar. 31, 2023 (CN) ......................... 202310366064.2

(51) Int. Cl.

| | |
|---|---|
| ***H04N 19/44*** | (2014.01) |
| ***H04N 19/33*** | (2014.01) |
| ***H04N 19/60*** | (2014.01) |

(52) U.S. Cl.
CPC ............. *H04N 19/44* (2014.11); *H04N 19/33* (2014.11); *H04N 19/60* (2014.11)

(58) Field of Classification Search
None
See application file for complete search history.

(56) References Cited

U.S. PATENT DOCUMENTS

| | | | |
|---|---|---|---|
| 2022/0092827 | A1 | 3/2022 | Ji-Hoon et al. |
| 2022/0284547 | A1 | 9/2022 | Jianjun et al. |

(Continued)

FOREIGN PATENT DOCUMENTS

| | | | |
|---|---|---|---|
| CN | 1921627 | A | 2/2007 |
| CN | 105472389 | A | 4/2016 |

(Continued)

OTHER PUBLICATIONS

International Search Report in International Appln. No. PCT/CN2024/084961, mailed on Jun. 15, 2024, 6 pages (with English translation).

(Continued)

*Primary Examiner* — Christopher Braniff
(74) *Attorney, Agent, or Firm* — Fish & Richardson P.C.

(57) ABSTRACT

The present disclosure belongs to the field of image processing technologies, and in particular, to an image decoding method and apparatus, an image coding method and apparatus, a device and a storage medium. The image decoding method of the present disclosure includes: extracting image residual data or extended residual data from an image bitstream, and obtaining a plurality of extended residual groups based on the extracted image residual data or extended residual data; obtaining respective image reconstruction features corresponding to the extended residual groups by performing residual restoration on each of the plurality of extended residual groups; obtaining reconstructed feature data by performing spatial resolution ampli- (Continued)

fication processing on the respective image reconstruction features corresponding to the extended residual groups; and obtaining a reconstructed image block by performing image reconstruction according to the reconstructed feature data.

17 Claims, 10 Drawing Sheets

(56) References Cited

U.S. PATENT DOCUMENTS

| | | | | |
|---|---|---|---|---|
| 2022/0286696 | A1 | 9/2022 | Ge et al. | |
| 2024/0414345 | A1* | 12/2024 | He | H04N 19/42 |

FOREIGN PATENT DOCUMENTS

| | | | |
|---|---|---|---|
| CN | 108765297 | A | 11/2018 |
| CN | 109547784 | A | 3/2019 |
| CN | 110619387 | A | 12/2019 |
| CN | 113556567 | A | 10/2021 |
| CN | 114501011 | A | 5/2022 |
| CN | 114943643 | A | 8/2022 |
| CN | 115150628 | A | 10/2022 |
| EP | 1551184 | A2 | 7/2005 |
| TW | 201818346 | A | 5/2018 |
| WO | WO 2022088631 | A1 | 5/2022 |
| WO | WO 2023279961 | A1 | 1/2023 |

OTHER PUBLICATIONS

Misra et al., "Video Feature Compression for Machine Tasks," presented at the 2022 IEEE International Conference on Multimedia and Expo (ICME), Taipei City, Taiwan, Jul. 11-15, 2022, 6 pages.

Decision of Rejection in Taiwanese Appln. No. 113112224, mailed on May 19, 2025, 7 pages (with English translation).

Notice of Allowance in Taiwanese Appln. No. 113112224, mailed on Aug. 13, 2025, 6 pages (with English translation).

Office Action in Chinese Appln. No. 202310366064.2, mailed on Sep. 5, 2025, 18 pages (with English translation).

Office Action in Chinese Appln. No. 202411379207.4, mailed on Sep. 6, 2025, 16 pages (with English translation).

Office Action in Taiwanese Appln. No. 113112224, mailed on Jan. 3, 2025, 25 pages (with English translation).

* cited by examiner

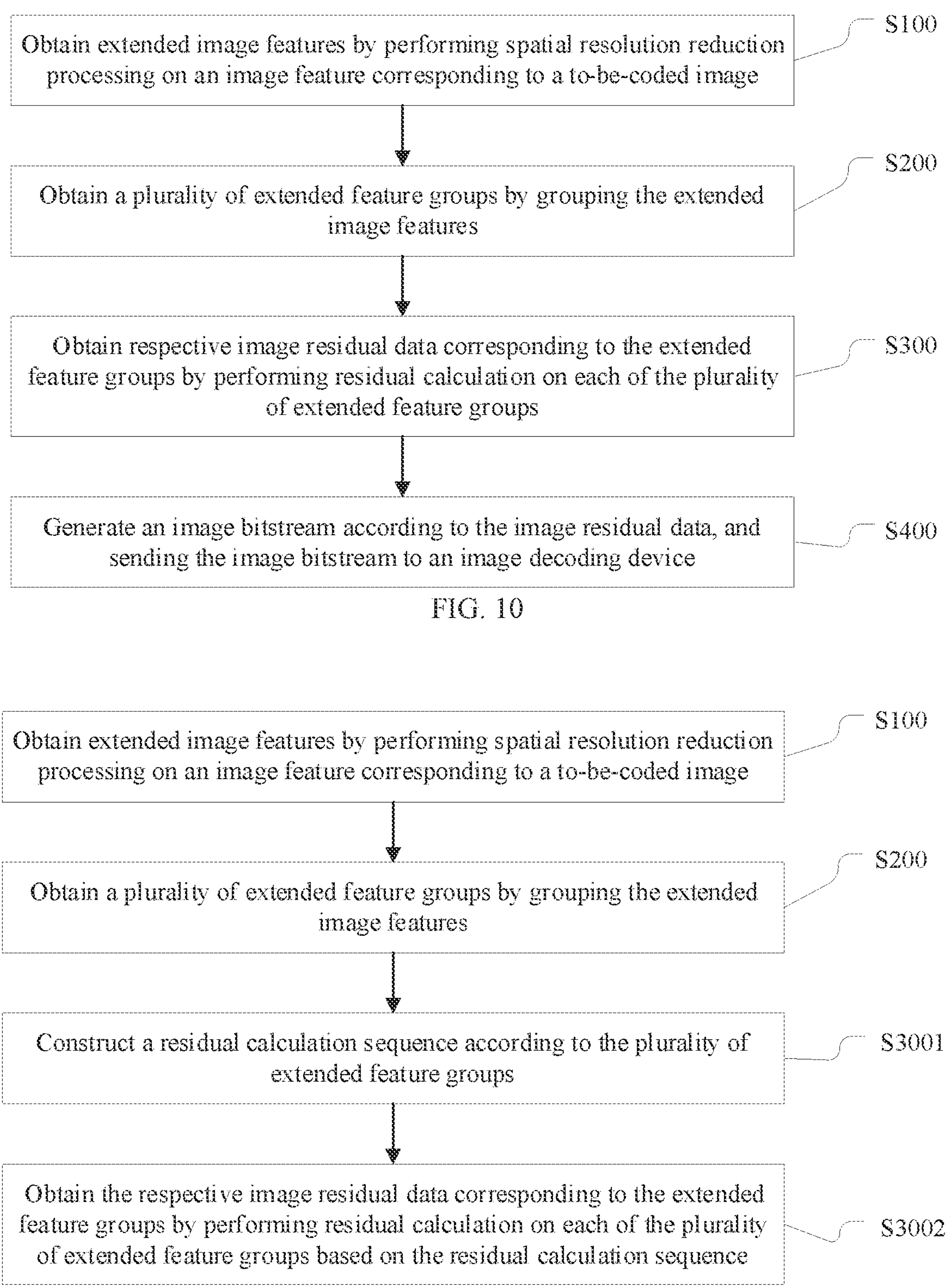
Obtain extended image features by performing spatial resolution reduction processing on an image feature corresponding to a to-be-coded image
S100
Obtain a plurality of extended feature groups by grouping the extended image features
S200
Obtain respective image residual data corresponding to the extended feature groups by performing residual calculation on each of the plurality of extended feature groups
S300
Generate an image bitstream according to the image residual data, and sending the image bitstream to an image decoding device
S400
FIG. 10
Obtain extended image features by performing spatial resolution reduction processing on an image feature corresponding to a to-be-coded image
S100
Obtain a plurality of extended feature groups by grouping the extended image features
S200
Construct a residual calculation sequence according to the plurality of extended feature groups
S3001
Obtain the respective image residual data corresponding to the extended feature groups by performing residual calculation on each of the plurality of extended feature groups based on the residual calculation sequence
S3002
FIG. 11

Image coding apparatus

Feature extraction module — 100

Data grouping module — 200

Residual calculation module — 300

Bitstream generation module — 400

IMAGE DECODING METHOD AND APPARATUS, IMAGE CODING METHOD AND APPARATUS, AND DEVICE AND STORAGE MEDIUM

CROSS-REFERENCE TO RELATED APPLICATION

The present application is a U.S. National Stage of International Application No. PCT/CN2024/084961, filed on Mar. 29, 2024, which claims the benefit of priority to Chinese Application No. 202310366064.2, filed on Mar. 31, 2023, the contents of all of which are incorporated by reference herein in their entireties for all purposes.

TECHNICAL FIELD

The present disclosure relates to the field of image processing technologies, and in particular, to an image decoding method and apparatus, an image coding method and apparatus, a device and a storage medium.

BACKGROUND

In deep learning-based image compression schemes, it is a mainstream practice to utilize already decoded feature points as prior information for mean prediction of currently decoded feature points to reduce spatial redundancy in images. Conventional schemes generally employ serial or wave-front approaches for encoding and decoding, where the degree of serialization increases with the resolution of the features, resulting in relatively high overall computational complexity.

The above content is only used to assist in understanding the technical solution of the present disclosure and does not represent an acknowledgment that the above content is prior art.

SUMMARY

The main purpose of the present disclosure is to provide an image decoding method and apparatus, an image coding method and apparatus, a device and a storage medium, aiming to solve the technical problem of high time complexity in mean prediction during the image coding and decoding process in the prior art.

To achieve the above purpose, the present disclosure provides an image decoding method, which includes the following steps:

- extracting image residual data or extended residual data from an image bitstream, and obtaining a plurality of extended residual groups based on the extracted image residual data or the extended residual data;
- obtaining respective image reconstruction features corresponding to the extended residual groups by performing residual restoration on each of the plurality of extended residual groups;
- obtaining reconstructed feature data by performing spatial resolution amplification processing on the respective image reconstruction features corresponding to the extended residual groups; and
- obtaining a reconstructed image block by performing image reconstruction according to the reconstructed feature data.

In a possible implementation of the present disclosure, the extracting image residual data or extended residual data from an image bitstream, and obtaining a plurality of extended residual groups based on the extracted image residual data or extended residual data includes: extracting the image residual data from the image bitstream;

- obtaining the extended residual data by performing spatial resolution reduction processing on the image residual data, where the spatial resolution amplification processing is an inverse process of the spatial resolution reduction processing; and
- obtaining the plurality of extended residual groups by grouping the extended residual data.

In a possible implementation of the present disclosure, the obtaining the extended residual data by performing spatial resolution reduction processing on the image residual data includes:

- obtaining the extended residual data by reducing a spatial size corresponding to the image residual data and/or increasing a number of feature channels corresponding to the image residual data.

In a possible implementation of the present disclosure, the obtaining the extended residual data by reducing a spatial size corresponding to the image residual data and/or increasing a number of feature channels corresponding to the image residual data includes:

- obtaining the extended residual data by reducing the spatial size corresponding to the image residual data and/or increasing the number of feature channels corresponding to the image residual data according to spatial information corresponding to the image residual data.

In a possible implementation of the present disclosure, the obtaining respective image reconstruction features corresponding to the extended residual groups by performing residual restoration on each of the plurality of extended residual groups includes:

- constructing a residual restoration sequence according to the plurality of extended residual groups; and
- obtaining the respective image reconstruction features corresponding to the extended residual groups by performing residual restoration on each of the plurality of extended residual groups based on the residual restoration sequence.

In a possible implementation of the present disclosure, the step of obtaining the respective image reconstruction features corresponding to the extended residual groups by performing residual restoration on each of the plurality of extended residual groups based on the residual restoration sequence includes:

- obtaining a current extended residual group by traversing the residual restoration sequence;
- acquiring auxiliary information output by an auxiliary coding network;
- constructing prior information according to the auxiliary information;
- obtaining an image reconstruction feature corresponding to the current extended residual group by performing residual restoration on the current extended residual group based on the prior information; and
- obtaining the respective image reconstruction features corresponding to the extended residual groups upon a completion of the traversing.

In a possible implementation of the present disclosure, the constructing prior information according to the auxiliary information includes:

- obtaining extended auxiliary information;
- determining whether the current extended residual group is a first element in the residual restoration sequence;

when the current extended residual group is the first element, constructing the prior information according to the extended auxiliary information; or when the current extended residual group is not the first element, obtaining concatenated auxiliary information by concatenating the extended auxiliary information with a convolution processing result corresponding to an image reconstruction feature of a restored extended residual group; and constructing the prior information based on the concatenated auxiliary information.

In addition, to achieve the above purpose, the present disclosure further provides an image coding method, including:

obtaining extended image features by performing spatial resolution reduction processing on an image feature corresponding to a to-be-coded image;

obtaining a plurality of extended feature groups by grouping the extended image features;

obtaining respective image residual data corresponding to the extended feature groups by performing residual calculation on each of the plurality of extended feature groups; and generating an image bitstream according to the image residual data, and sending the image bitstream to an image decoding device.

In a possible implementation of the present disclosure, the obtaining extended image features by performing spatial resolution reduction processing on an image feature corresponding to a to-be-coded image includes:

acquiring the image feature corresponding to the to-be-coded image;

obtaining the extended image features by performing spatial resolution reduction processing on data in the image feature.

In a possible implementation of the present disclosure, the obtaining extended image features by performing spatial resolution reduction processing on an image feature corresponding to a to-be-coded image includes:

obtaining the extended image features by reducing a spatial size corresponding to the image feature of the to-be-coded image and/or increasing a number of feature channels corresponding to the image feature.

In a possible implementation of the present disclosure, the obtaining the extended image features by reducing a spatial size corresponding to the image feature of the to-be-coded image and/or increasing a number of feature channels corresponding to the image feature includes:

obtaining the extended image features by reducing the spatial size corresponding to the image feature and/or increasing the number of feature channels corresponding to the image feature according to spatial information corresponding to the image feature of the to-be-coded image.

In a possible implementation of the present disclosure, the obtaining respective image residual data corresponding to the extended feature groups by performing residual calculation on each of the plurality of extended feature groups includes:

constructing a residual calculation sequence according to the plurality of extended feature groups; and obtaining the respective image residual data corresponding to the extended feature groups by performing residual calculation on each of the plurality of extended feature groups based on the residual calculation sequence.

In a possible implementation of the present disclosure, the obtaining the respective image residual data corresponding to the extended feature groups by performing residual calculation on each of the plurality of extended feature groups based on the residual calculation sequence includes:

obtaining a current extended feature group by traversing the residual calculation sequence;

acquiring auxiliary information output by an auxiliary coding network;

constructing prior information according to the auxiliary information;

obtaining image residual data corresponding to the current extended feature group by performing residual calculation on the current extended feature group based on the prior information; and obtaining the respective image residual data corresponding to the extended feature groups upon a completion of the traversing.

In a possible implementation of the present disclosure, the obtaining a plurality of extended feature groups by grouping the extended image features includes:

obtaining the plurality of extended feature groups by grouping the extended image features based on feature channels corresponding to the extended image features.

In a possible implementation of the present disclosure, the generating an image bitstream according to the image residual data, and sending the image bitstream to an image decoding device includes:

obtaining image residual data corresponding to the to-be-coded image by performing spatial resolution amplification processing on the respective image residual data corresponding to the extended feature groups, where the spatial resolution amplification processing is an inverse process of the spatial resolution reduction processing; and generating an image bitstream according to the image residual data corresponding to the to-be-coded image, and sending the image bitstream to the image decoding device.

In addition, to achieve the above purpose, the present disclosure further provides an image decoding apparatus, including:

a bitstream decoding module, configured to extract image residual data or extended residual data from an image bitstream, and obtain a plurality of extended residual groups based on the extracted image residual data or extended residual data;

a residual restoration module, configured to obtain respective image reconstruction features corresponding to the extended residual groups by performing residual restoration on each of the plurality of extended residual groups;

a data combination module, configured to obtain reconstructed feature data by performing spatial resolution amplification processing on the respective image reconstruction features corresponding to the extended residual groups; and an image reconstruction module, configured to obtain a reconstructed image block by performing image reconstruction according to the reconstructed feature data.

In addition, to achieve the above purpose, the present disclosure further provides an image coding apparatus, including:

a feature extraction module, configured to obtain extended image features by performing spatial resolution reduction processing on an image feature corresponding to a to-be-coded image;

a data grouping module, configured to obtain a plurality of extended feature groups by grouping the extended image features;

a residual calculation module, configured to obtain respective image residual data corresponding to the extended feature groups by performing residual calculation on each of the plurality of extended feature groups; and a bitstream generation module, configured to generate an image bitstream according to the image residual data, and send the image bitstream to an image decoding device.

In addition, to achieve the above purpose, the present disclosure further provides an image decoding method, including:

extracting image residual data from an image bitstream, obtaining extended residual data by performing spatial resolution reduction processing on the image residual data, and obtaining a plurality of extended residual groups by grouping the extended residual data;

obtaining respective image reconstruction features corresponding to the extended residual groups by performing residual restoration on each of the plurality of extended residual groups;

obtaining reconstructed feature data by performing spatial resolution amplification processing on the respective image reconstruction features corresponding to the extended residual groups, where the spatial resolution amplification processing is an inverse process of the spatial resolution reduction processing; and obtaining a reconstructed image block by performing image reconstruction according to the reconstructed feature data.

In a possible implementation of the present disclosure, the obtaining extended residual data by performing spatial resolution reduction processing on the image residual data includes:

obtaining the extended residual data by reducing a spatial size corresponding to the image residual data and/or increasing a number of feature channels corresponding to the image residual data.

In a possible implementation of the present disclosure, the obtaining the extended residual data by reducing a spatial size corresponding to the image residual data and/or increasing a number of feature channels corresponding to the image residual data includes:

obtaining the extended residual data by reducing the spatial size corresponding to the image residual data according to spatial information corresponding to the image residual data; or obtaining the extended residual data by increasing the number of feature channels corresponding to the image residual data according to spatial information corresponding to the image residual data; or obtaining the extended residual data by reducing the spatial size corresponding to the image residual data according to spatial information corresponding to the image residual data and increasing the number of feature channels corresponding to the image residual data according to spatial information corresponding to the image residual data.

In a possible implementation of the present disclosure, the obtaining a plurality of extended residual groups by grouping the extended residual data includes:

grouping the extended residual data uniformly according to feature channels corresponding to the extended residual data.

In a possible implementation of the present disclosure, when performing spatial resolution amplification processing on the respective image reconstruction features corresponding to the extended residual groups, the spatial resolution amplification processing is used to restore a spatial size corresponding to the image reconstruction feature to be consistent with a spatial size corresponding to an image obtained by feature extraction of an original image, and the the spatial resolution amplification processing is used to restore a number of channels corresponding to the image reconstruction feature to be consistent with a number of channels corresponding to the image obtained by feature extraction of the original image.

In addition, to achieve the above purpose, the present disclosure further provides an image coding method, including:

obtaining extended image features by performing spatial resolution reduction processing on an image feature corresponding to a to-be-coded image;

obtaining a plurality of extended feature groups by grouping the extended image features;

obtaining respective image residual data corresponding to the extended feature groups by performing residual calculation on each of the plurality of extended feature groups, where after obtaining respective image reconstruction features corresponding to the extended feature groups, obtaining respective image residual data corresponding to the extended feature groups by performing spatial resolution amplification processing on the respective image reconstruction features corresponding to the extended feature groups, where the spatial resolution amplification processing is an inverse process of the spatial resolution reduction processing; and generating an image bitstream according to the image residual data, and sending the image bitstream to an image decoding device.

In addition, to achieve the above purpose, the present disclosure further provides an image decoding apparatus, including:

a bitstream decoding module, configured to extract image residual data from an image bitstream, obtain extended residual data by performing spatial resolution reduction processing on the image residual data, and obtain a plurality of extended residual groups by grouping the extended residual data;

a residual restoration module, configured to obtain respective image reconstruction features corresponding to the extended residual groups by performing residual restoration on each of the plurality of extended residual groups;

a data combination module, configured to obtain reconstructed feature data by performing spatial resolution amplification processing on the respective image reconstruction features corresponding to the extended residual groups, where the spatial resolution amplification processing is an inverse process of the spatial resolution reduction processing; and an image reconstruction module, configured to obtain a reconstructed image block by performing image reconstruction according to the reconstructed feature data.

In addition, to achieve the above purpose, the present disclosure further provides an image coding apparatus, including:

a feature extraction module, configured to obtain extended image features by performing spatial resolution reduction processing on an image feature corresponding to a to-be-coded image;

a data grouping module, configured to obtain a plurality of extended feature groups by grouping the extended image features;

a residual calculation module, configured to obtain respective image residual data corresponding to the extended feature groups by performing residual calculation on each of the plurality of extended feature groups, where after obtaining respective image reconstruction features corresponding to the extended feature groups, the residual calculation module obtains respective image residual data corresponding to the extended feature groups by performing spatial resolution amplification processing on the respective image reconstruction features corresponding to the extended feature groups, where the spatial resolution amplification processing is an inverse process of the spatial resolution reduction processing; and a bitstream generation module, configured to generate an image bitstream according to the image residual data, and send the image bitstream to an image decoding device.

In addition, to achieve the above purpose, the present disclosure further provides an image decoding method, including:

obtaining a plurality of extended residual groups by grouping extended residual data;

constructing a residual restoration sequence according to the plurality of extended residual groups; and obtaining the respective image reconstruction features corresponding to the extended residual groups by performing residual restoration on each of the plurality of extended residual groups based on the residual restoration sequence;

obtaining reconstructed feature data by performing spatial resolution amplification processing on the respective image reconstruction features corresponding to the extended residual groups; and obtaining a reconstructed image block by performing image reconstruction according to the reconstructed feature data.

In a possible implementation of the present disclosure, the obtaining the respective image reconstruction features corresponding to the extended residual groups by performing residual restoration on each of the plurality of extended residual groups based on the residual restoration sequence includes:

obtaining a current extended residual group by traversing the residual restoration sequence;

acquiring prior information;

obtaining an image reconstruction feature corresponding to the current extended residual group by performing residual restoration on the current extended residual group based on the prior information; and obtaining the respective image reconstruction features corresponding to the extended residual groups upon a completion of the traversing.

In a possible implementation of the present disclosure, the acquiring prior information includes:

obtaining extended auxiliary information based on information output by an auxiliary coding network;

determining whether the current extended residual group is a first element in the residual restoration sequence;

when the current extended residual group is the first element, constructing the prior information according to the extended auxiliary information; or when the current extended residual group is not the first element, obtaining concatenated auxiliary information by concatenating the extended auxiliary information with a convolution processing result corresponding to an image reconstruction feature of a restored extended residual group, and constructing the prior information based on the concatenated auxiliary information.

In a possible implementation of the present disclosure, the obtaining an image reconstruction feature corresponding to the current extended residual group by performing residual restoration on the current extended residual group based on the prior information includes:

obtaining a predicted mean by processing the prior information through a convolutional neural network; and obtaining the image reconstruction feature corresponding to the current extended residual group by adding the predicted mean with a residual in the current extended residual group.

In a possible implementation of the present disclosure, when performing spatial resolution amplification processing on the respective image reconstruction features corresponding to the extended residual groups, the spatial resolution amplification processing is used to restore a spatial size corresponding to the image reconstruction feature to be consistent with a spatial size corresponding to an image obtained by feature extraction of an original image, and the the spatial resolution amplification processing is used to restore a number of channels corresponding to the image reconstruction feature to be consistent with a number of channels corresponding to the image obtained by feature extraction of the original image.

In addition, to achieve the above purpose, the present disclosure further provides an image coding method, including:

obtaining extended image features by performing spatial resolution reduction processing on an image feature corresponding to a to-be-coded image;

obtaining a plurality of extended feature groups by grouping the extended image features;

constructing a residual calculation sequence according to the plurality of extended feature groups, and obtaining the respective image residual data corresponding to the extended feature groups by performing residual calculation on each of the plurality of extended feature groups based on the residual calculation sequence, where after obtaining respective image reconstruction features corresponding to the extended feature groups, obtaining respective image residual data corresponding to the extended feature groups by performing spatial resolution amplification processing on the respective image reconstruction features corresponding to the extended feature groups, where the spatial resolution amplification processing is an inverse process of the spatial resolution reduction processing; and generating an image bitstream according to the image residual data, and sending the image bitstream to an image decoding device.

In addition, to achieve the above purpose, the present disclosure further provides an image decoding apparatus, including:

a bitstream decoding module, configured to obtain a plurality of extended residual groups by grouping extended residual data;

a residual restoration module, configured to construct a residual restoration sequence according to the plurality of extended residual groups; and obtain the respective image reconstruction features corresponding to the extended residual groups by performing residual restoration on each of the plurality of extended residual groups based on the residual restoration sequence;

a data combination module, configured to obtain reconstructed feature data by performing spatial resolution amplification processing on the respective image reconstruction features corresponding to the extended residual groups; and an image reconstruction module, configured to obtain a reconstructed image block by performing image reconstruction according to the reconstructed feature data.

In addition, to achieve the above purpose, the present disclosure further provides an image coding apparatus, including:

a feature extraction module, configured to obtain extended image features by performing spatial resolution reduction processing on an image feature corresponding to a to-be-coded image;

a data grouping module, configured to obtain a plurality of extended feature groups by grouping the extended image features;

a residual calculation module, configured to construct a residual calculation sequence according to the plurality of extended feature groups, and obtain the respective image residual data corresponding to the extended feature groups by performing residual calculation on each of the plurality of extended feature groups based on the residual calculation sequence, where after obtaining respective image reconstruction features corresponding to the extended feature groups, obtaining respective image residual data corresponding to the extended feature groups by performing spatial resolution amplification processing on the respective image reconstruction features corresponding to the extended feature groups, where the spatial resolution amplification processing is an inverse process of the spatial resolution reduction processing; and a bitstream generation module, configured to generate an image bitstream according to the image residual data, and send the image bitstream to an image decoding device.

In addition, to achieve the above purpose, the present disclosure further provides an image decoding method, including:

obtaining a plurality of extended residual groups;

obtaining respective image reconstruction features corresponding to the extended residual groups by performing residual restoration on each of the plurality of extended residual groups;

obtaining reconstructed feature data by performing spatial resolution amplification processing on the respective image reconstruction features corresponding to the extended residual groups; and obtaining a reconstructed image block after image reconstruction by performing synthesis transformation processing on the reconstructed feature data through a pre-constructed synthesis transform network, where the synthesis transform network is constructed based on deep learning or the synthesis transform network is constructed based on a neural network.

In a possible implementation of the present disclosure, when performing spatial resolution amplification processing on the respective image reconstruction features corresponding to the extended residual groups, the spatial resolution amplification processing is used to restore a spatial size corresponding to the image reconstruction feature to be consistent with a spatial size corresponding to an image obtained by feature extraction of an original image, and the the spatial resolution amplification processing is used to restore a number of channels corresponding to the image reconstruction feature to be consistent with a number of channels corresponding to the image obtained by feature extraction of the original image.

In a possible implementation of the present disclosure, the obtaining respective image reconstruction features corresponding to the extended residual groups by performing residual restoration on each of the plurality of extended residual groups includes:

constructing a residual restoration sequence according to the plurality of extended residual groups; and obtaining the respective image reconstruction features corresponding to the extended residual groups by performing residual restoration on each of the plurality of extended residual groups based on the residual restoration sequence.

In a possible implementation of the present disclosure, the obtaining a plurality of extended residual groups includes:

extracting image residual data from an image bitstream;

obtaining the extended residual data by performing spatial resolution reduction processing on the image residual data; and obtaining the plurality of extended residual groups by grouping the extended residual data, where the spatial resolution amplification processing is an inverse process of the spatial resolution reduction processing.

In a possible implementation of the present disclosure, the obtaining a plurality of extended residual groups includes:

extracting extended residual data from an image bitstream; and obtaining the plurality of extended residual groups by grouping the extended residual data.

In addition, to achieve the above purpose, the present disclosure further provides an image coding method, including:

obtaining extended image features by performing spatial resolution reduction processing on an image feature corresponding to a to-be-coded image;

obtaining a plurality of extended feature groups by grouping the extended image features;

obtaining respective image residual data corresponding to the extended feature groups by performing residual calculation on each of the plurality of extended feature groups, where after obtaining respective image reconstruction features corresponding to the extended feature groups, obtaining respective image residual data corresponding to the extended feature groups by performing spatial resolution amplification processing on the respective image reconstruction features corresponding to the extended feature groups, where the spatial resolution amplification processing is an inverse process of the spatial resolution reduction processing; and a reconstructed image block after image reconstruction is obtained by performing synthesis transformation processing on the image reconstruction feature through a pre-constructed synthesis transform network, where the synthesis transform network is constructed based on deep learning or the synthesis transform network is constructed based on a neural network; and generating an image bitstream according to the image residual data, and sending the image bitstream to an image decoding device.

In addition, to achieve the above purpose, the present disclosure further provides an image decoding apparatus, including:

a bitstream decoding module, configured to obtain a plurality of extended residual groups;

- a residual restoration module, configured to obtain respective image reconstruction features corresponding to the extended residual groups by performing residual restoration on each of the plurality of extended residual groups;
- a data combination module, configured to obtain reconstructed feature data by performing spatial resolution amplification processing on the respective image reconstruction features corresponding to the extended residual groups; and
- an image reconstruction module, configured to obtain a reconstructed image block after image reconstruction by performing synthesis transformation processing on the reconstructed feature data through a pre-constructed synthesis transform network, where the synthesis transform network is constructed based on deep learning or the synthesis transform network is constructed based on a neural network.

In addition, to achieve the above purpose, the present disclosure further provides an image coding apparatus, including:

- a feature extraction module, configured to obtain extended image features by performing spatial resolution reduction processing on an image feature corresponding to a to-be-coded image;
- a data grouping module, configured to obtain a plurality of extended feature groups by grouping the extended image features;
- a residual calculation module, configured to obtain respective image residual data corresponding to the extended feature groups by performing residual calculation on each of the plurality of extended feature groups, where after obtaining respective image reconstruction features corresponding to the extended feature groups, obtaining respective image residual data corresponding to the extended feature groups by performing spatial resolution amplification processing on the respective image reconstruction features corresponding to the extended feature groups, where the spatial resolution amplification processing is an inverse process of the spatial resolution reduction processing; and a reconstructed image block after image reconstruction is obtained by performing synthesis transformation processing on the image reconstruction feature through a pre-constructed synthesis transform network, where the synthesis transform network is constructed based on deep learning or the synthesis transform network is constructed based on a neural network; and
- a bitstream generation module, configured to generate an image bitstream according to the image residual data, and send the image bitstream to an image decoding device.

In addition, to achieve the above purpose, the present disclosure further provides a decoding device, including: at least one processor, a memory, and an image decoding program stored in the memory and executable on the at least one processor, where the image decoding program, when executed by the processor, causes the at least one processor to perform the steps of the image decoding method as described above.

In addition, to achieve the above purpose, the present disclosure further provides a coding device, including: at least one processor, a memory, and an image decoding program and/or an image coding program stored in the memory and executable on the at least one processor, where the image decoding program, when executed by the at least one processor, causes the at least one processor to perform the steps of the image decoding method as described above, and the image coding program when executed by the at least one processor, causes the at least one processor to perform the steps of the image coding method as described above.

In addition, to achieve the above purpose, the present disclosure further provides a storage medium, on which an image decoding program and/or an image coding program are stored, where the image decoding program cause a processor to perform the steps of the image decoding method as described above when executed, and the image coding program cause the processor to perform the steps of the image coding method as described above when executed.

In addition, to achieve the above purpose, the present disclosure further provides a computer program, configured to, when executed by at least one processor with a memory, causes the at least one processor to perform the steps of the image decoding method as described above, or perform the steps of the image coding method as described above.

In addition, to achieve the above purpose, the present disclosure further provides a computer program product, including computer program instructions, configured to, when executed by at least one processor having a memory, cause the at least one processor to perform the steps of the image decoding method as described above, or perform the steps of the image coding method as described above.

In the present disclosure, image residual data or extended residual data is extracted from an image bitstream, and a plurality of extended residual groups are obtained based on the extracted image residual data or extended residual data; respective image reconstruction features corresponding to the extended residual groups is obtained by performing residual restoration on each of the plurality of extended residual groups; reconstructed feature data is obtained by performing spatial resolution amplification processing on the respective image reconstruction features corresponding to the extended residual groups; and a reconstructed image block is obtained by performing image reconstruction according to the reconstructed feature data. Since the obtained extended residual data has undergone spatial resolution reduction processing, residual restoration processing can be performed on entire groups at a lower resolution, thereby improving the overall computational efficiency of residual restoration and reducing time complexity.

BRIEF DESCRIPTION OF DRAWINGS

FIG. 10 is a schematic flowchart of a first embodiment of an image coding method according to the present disclosure.

FIG. 11 is a schematic flowchart of a second embodiment of an image coding method according to the present disclosure.

The realization, functional characteristics and advantages of the present disclosure will be further described with reference to the accompanying drawings in conjunction with the embodiments.

DETAILED DESCRIPTION

It should be understood that the specific embodiments described herein are only for explaining the present disclosure and are not intended to limit the present disclosure.

Figure 1:
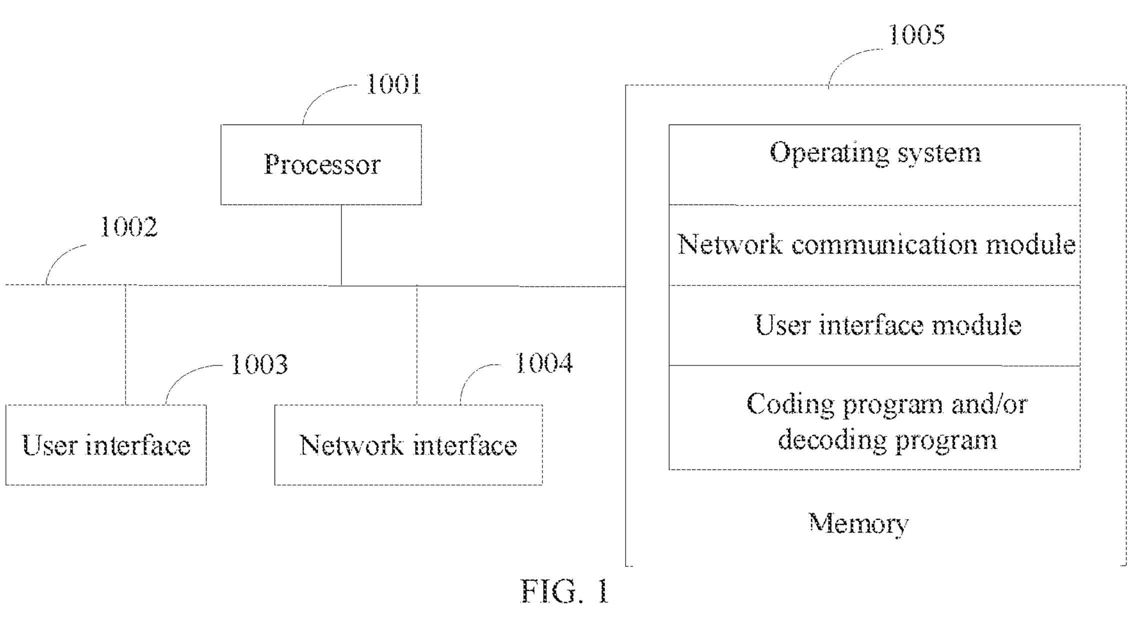
FIG. 1 is a schematic diagram of a structure of an electronic device in a hardware operating environment according to an embodiment of the present disclosure.

Referring to FIG. 1, FIG. 1 is a schematic diagram of a structure of a decoding device or a coding device in a hardware operating environment according to an embodiment of the present disclosure.

As shown in FIG. 1, the electronic device may include: a processor 1001, such as a Central Processing Unit (CPU), a communication bus 1002, a user interface 1003, a network interface 1004, and a memory 1005. The communication bus 1002 is configured to realize connection communication between these components. The user interface 1003 may include a Display and an input unit such as a Keyboard, and optionally, the user interface 1003 may further include a standard wired interface and a wireless interface. The network interface 1004 may optionally include a standard wired interface and a wireless interface (such as a Wireless-Fidelity (Wi-FI) interface). The memory 1005 may be a high-speed Random Access Memory (RAM) or a stable Non-Volatile Memory (NVM), such as a disk memory. The memory 1005 may optionally further be a storage apparatus independent of the aforementioned processor 1001.

Those skilled in the art can understand that the structure shown in FIG. 1 does not constitute a limitation on the electronic device, and it may include more or fewer components than those shown, or combine certain components, or arrange different components.

As shown in FIG. 1, the memory 1005, as a storage medium, may include an operating system, a network communication module, a user interface module, and an image decoding program and/or an image coding program.

In the electronic device shown in FIG. 1, the network interface 1004 is mainly used for data communication with a network server; the user interface 1003 is mainly used for data interaction with users; the processor 1001 and memory 1005 in the electronic device of the present disclosure may be disposed in the decoding device or the coding device, and the electronic device calls the image decoding program and/or the image coding program stored in the memory 1005 through the processor 1001 to execute the image decoding method or the image coding method provided in the embodiments of the present disclosure.

Figure 2:
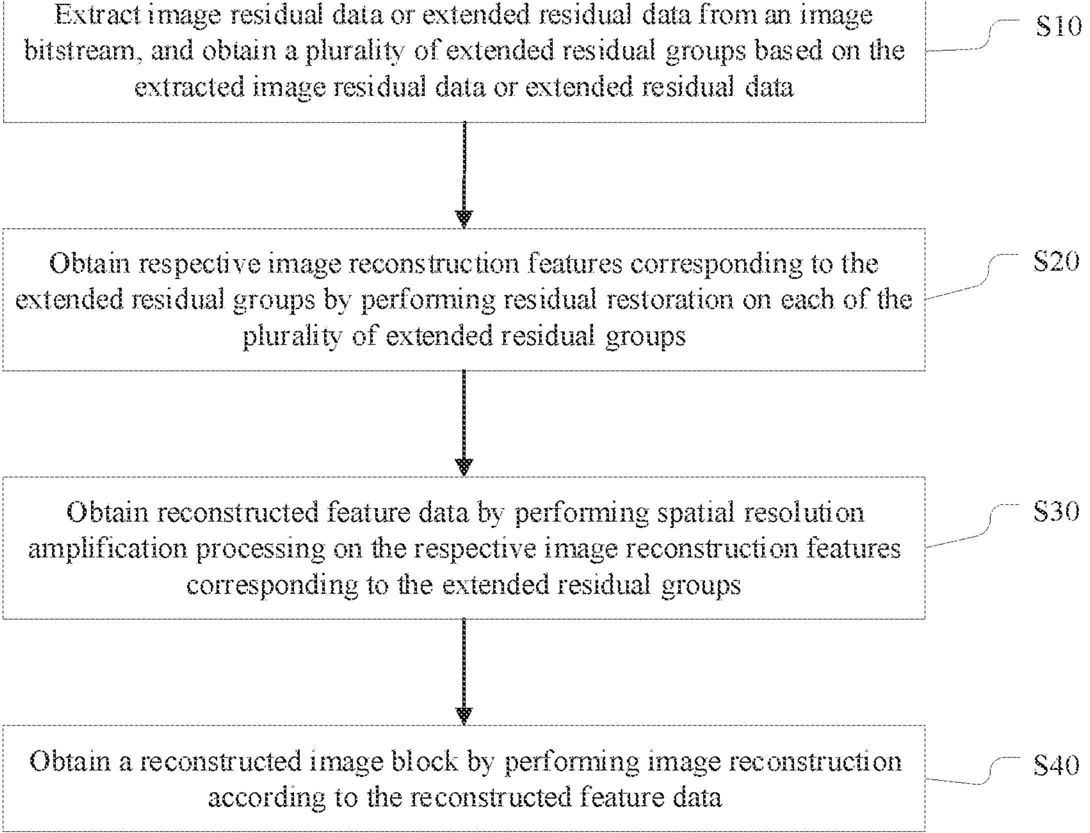
FIG. 2 is a flowchart of a first embodiment of an image decoding method according to the present disclosure.

An embodiment of the present disclosure provides an image decoding method, referring to FIG. 2, which is a flowchart of a first embodiment of an image decoding method of the present disclosure.

In this embodiment, the image decoding method includes the following steps.

Step S10: extracting image residual data or extended residual data from an image bitstream, and obtaining a plurality of extended residual groups based on the extracted image residual data or extended residual data.

It should be noted that the execution subject of this embodiment may be a decoding device when decoding image data, and the decoding device may be an electronic device such as a personal computer, a server, etc. Of course, it can also be other devices that can realize the same or similar functions, and this embodiment is not limited to this. In this embodiment and the following embodiments, the image decoding method of the present disclosure will be explained by taking the decoding device as an example.

In the process of image coding, a coding device generally decodes a coded image bitstream after the coding is completed, and determines whether the parameters used in the coding need to be adjusted according to the image quality of the decoded image, so the execution subject of this embodiment may also be the coding device.

It should be noted that the image bitstream may be the bitstream generated by the encoding device after encoding the image data that needs to be compressed and encoded. When generating the image bitstream, the coding device performs spatial resolution reduction processing on image features to reduce time complexity of mean prediction during the coding process. Finally, the coding device directly codes the generated image residual data or extended residual data into the image bitstream. In this case, the decoding device can directly extract the image residual data or extended residual data from the image bitstream. The decoding device can then process the extracted image residual data or extended residual data to obtain a plurality of extended residual groups and perform residual restoration group by group, thereby reducing the time complexity of mean prediction during the image decoding process.

The technical terms involved in image coding or decoding include: Joint Photographic Experts Group (JPEG), Joint Photographic Experts Group Artificial Intelligence (JPEG-AI), Entropy Encoding, Neural Network (NN), Convolutional Neural Network (CNN), feature, Rate-Distortion Optimized, etc., which are explained here.

Joint Photographic Experts Group (JPEG) is a standard for continuous-tone still image compression, with file extensions of .jpg or jpeg, and is the most commonly used image file format. It mainly adopts a joint coding mode of predictive coding (e.g., Differential Pulse Code Modulation, DPCM), Discrete Cosine Transform (DCT) and entropy encoding to remove redundant images and color data, which belongs to lossy compression format. It can compress images in a small storage space, which will cause damage to image data to some extent. Especially when using an excessively high compression ratio, the quality of the image recovered after final decompression will be reduced. If high-quality images are desired, an excessively high compression ratio should not be used.

The scope of JPEG-AI is to create a learning-based image coding standard that provides a single-stream, compact compressed-domain representation, targeting human visualization and significantly improving compression efficiency compared to commonly used image coding standards at the same subjective quality, as well as effective performance for image processing and computer vision tasks. JPEG-AI is aimed at a wide range of applications, such as cloud storage, visual surveillance, autonomous vehicles and devices, image acquisition, storage, and management, real-time monitoring of visual data, and media distribution. The goal is to design a coding solution that significantly improves the compression efficiency of commonly used coding standards at the same subjective quality and provides effective compressed-domain processing for machine learning-based image processing and computer vision tasks. Other key requirements include hardware/software implementation-friendly encoding and decoding, support for 8-bit and 10-bit depths, efficient encoding of images using text and graphics, and progressive decoding.

Entropy encoding refers to encoding that does not lose any information during the encoding process according to the principle of entropy. Information entropy is average information content (a measure of uncertainty) of the information source. Common entropy coding includes Shannon coding, Huffman coding and arithmetic coding.

In the present disclosure, the neural network refers to an artificial neural network rather than a biological neural network. A neural network is a computational model composed of a large number of interconnected nodes (or neurons). In an artificial neural network, processing units (neurons) may represent different objects, such as features, letters, concepts, or some meaningful abstract patterns. The types of processing units in the network are divided into three categories: input units, output units, and hidden units. Input units receive signals and data from the external world; output units realize the output of the system's processing results; hidden units are located between input and output units and cannot be observed from outside the system. Connection weights between neurons reflect connection strengths between units, and representation and processing of information are embodied in the connection relationships of the network's processing units. An artificial neural network is a non-programmed, brain-like information processing method. Its essence is to achieve a parallel distributed information processing function through network transformations and dynamic behaviors, and to mimic the information processing functions of the human brain's neural system to varying degrees and levels. At present, in the field of video processing, commonly used neural networks include Convolutional Neural networks (CNN), Recurrent Neural networks (RNN), fully connected networks, etc.

A Convolutional Neural Network (CNN) is a type of feedforward neural network and one of the most representative network structures in deep learning technology. Its artificial neurons can respond to surrounding units within a certain coverage range, demonstrating excellent performance in large-scale image processing. Generally, a basic structure of a CNN includes two layers: one is a feature extraction layer (also named as a convolution layer), where an input of each neuron is connected to a local receptive field of a previous layer and a feature of that local is extracted. Once the local feature is extracted, its positional relationship with other features is also determined. The other is a feature mapping layer (also named as an activation layer), where each computational layer of the network is composed of multiple feature mappings, and each feature mapping is a plane where all neurons have equal weights. The feature mapping structure can adopt Sigmoid function, ReLU function, Leaky-ReLU function, PRELU function and Generalized Difference Network (GDN) function as activation functions for the convolutional network. Additionally, since neurons on a mapping plane share weights, the number of free parameters in the network is reduced. One of the advantages of CNN compared with the traditional image processing algorithm is that it avoids the complicated preprocessing process of images (extracting artificial features, etc.), and can directly input original imaged for end-to-end learning. One of the advantages of CNN compared with traditional neural networks is that the traditional neural networks are fully connected, that is, the neurons from the input layer to the hidden layer are all connected, which will lead to a huge number of parameters, making network training time-consuming and even difficult to train, while CNN avoids this difficulty through local connection and weight sharing.

Figure 3:
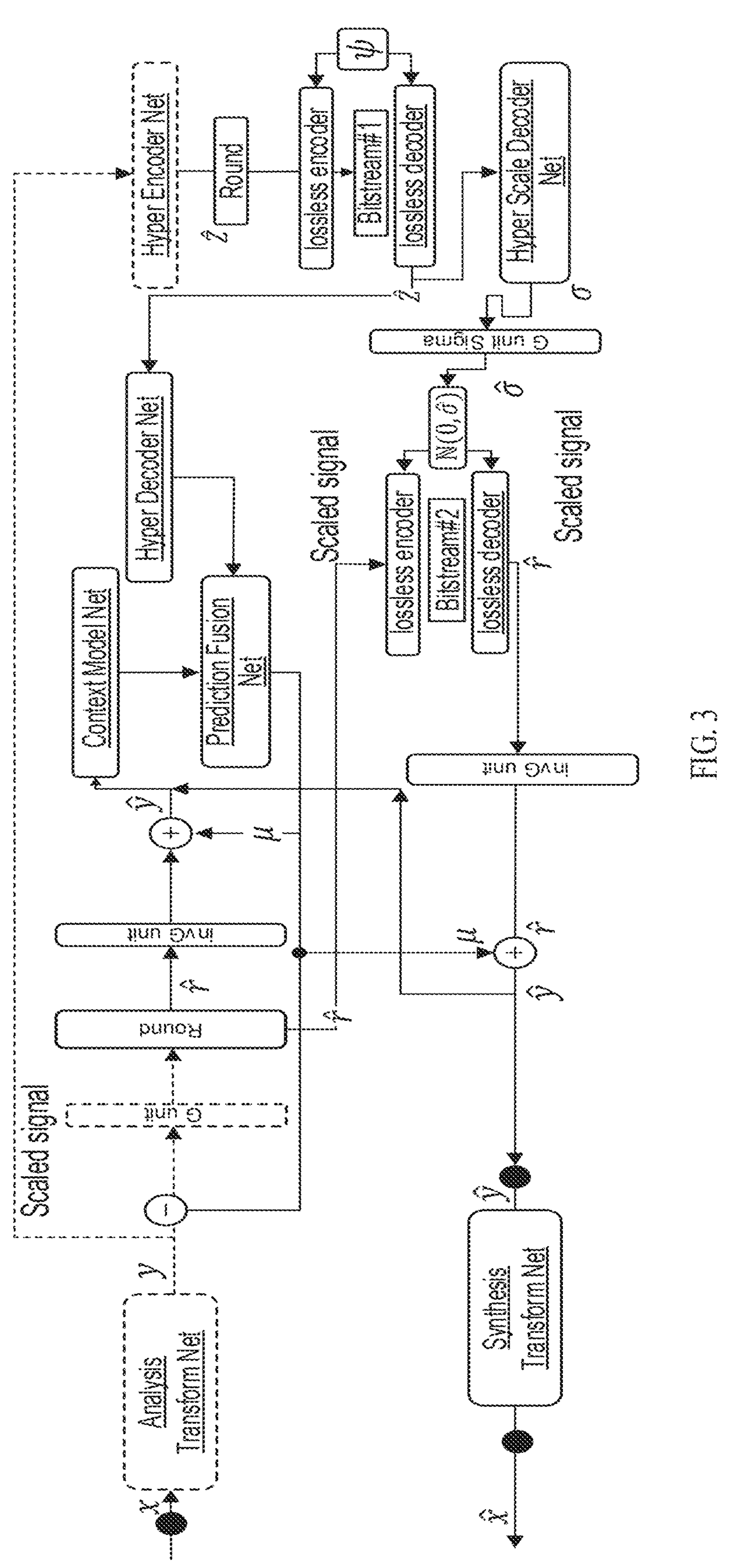
FIG. 3 is a schematic diagram of an overall framework for image compression according to the present disclosure.

The present disclosure relates to features that are a three-dimensional feature matrix of C×W×H (as shown in FIG. 3, which is a schematic diagram of a matrix structure of this embodiment). C represents the number of channels, H represents the feature height, and W represents the feature width. The feature matrix can be either an input or output of a neural network.

Metrics for evaluating coding efficiency include bit rate, PSNR, MS-SSIM, VMAF, FSIM, PSNRHVS, and many others. More metrics may also be included, and this is not limited here. The smaller the bit stream, the greater the compression ratio. The larger the PSNR, the better the image coding efficiency. During mode selection, a discriminant formula is essentially a comprehensive evaluation of these two factors. A cost corresponding to a mode is: $J(mode)=D+\lambda*R$. Here, D represents Distortion, usually measured by Sum of the Squared Errors (SSE), which is a mean square sum of differences between a reconstructed block and a source image; $\lambda$ is Lagrange multiplier; R is an actual number of bits required for image block coding in this mode, including total bits required for coding mode information, residuals, etc.

In a possible implementation of this embodiment, grouping the obtained extended residual data may be performed based on feature channels corresponding to each extended residual data. In this case, step S10 described in this embodiment may include:

- extracting the extended residual data from the image bitstream; and
- obtaining the plurality of extended residual groups by grouping the extended residual data based on feature channels corresponding to the extended residual data.

It should be noted that obtaining the plurality of extended residual groups by grouping the extended residual data based on feature channels corresponding to the extended residual data may involve uniformly dividing the extended residual data into multiple groups according to the corresponding feature channels. For example: assuming the total number of feature channels corresponding to the extended residual data is 20, the extended residual data corresponding to feature channels 1-10 may be grouped into one group, while the extended residual data corresponding to feature channels 11-20 may be grouped into another group. The number of uniformly divided groups may be preset by an administrator of the decoding device, and this embodiment does not limit this.

Certainly, non-uniform division may also be applied during specific grouping. In this case, obtaining the plurality of extended residual groups by grouping the extended residual data based on feature channels corresponding to the extended residual data may also be performed according to a preset grouping rule, which divides the extended residual data into multiple groups based on their corresponding feature channels. The preset grouping rule may be set in advance by the administrator of the decoding device according to actual needs. For example: the preset grouping rule may be set to group the first m/n (where n is the total number of feature channels, and m is a preset value within the range [1, n)) of the extended residual data into one group, and the remaining extended residual data into another group.

In practical applications, when obtaining the plurality of extended residual groups by grouping the extended residual data based on feature channels corresponding to the extended residual data, extended residual data corresponding to a single feature channel may also be divided into one group. For example: assuming the total number of feature channels corresponding to the extended residual data is 20, the extended residual data may be divided into 20 groups based on the different feature channels.

Step S20: obtaining respective image reconstruction features corresponding to the extended residual groups by performing residual restoration on each of the plurality of extended residual groups.

It should be noted that obtaining an image reconstruction feature corresponding to an extended residual group by performing residual restoration on the extended residual group may involve performing mean prediction on the extended residual group, and then adding residual data in the extended residual group to the predicted mean value, thereby obtaining the image reconstruction feature corresponding to the extended residual group.

Step S30: obtaining reconstructed feature data by performing spatial resolution amplification processing on the respective image reconstruction features corresponding to the extended residual groups.

It should be noted that since the extended residual data has undergone spatial resolution reduction processing, spatial size and number of channels corresponding to each data differ from those of image features obtained by the coding device during initial feature extraction of the original image. To ensure successful image reconstruction, spatial resolution amplification processing may be performed on the image reconstruction feature corresponding to each extended residual group, restoring spatial size and number of channels corresponding to the image reconstruction feature to match those of the image features obtained through feature extraction of the original image.

The spatial resolution amplification processing may be an inverse process of the spatial resolution reduction processing performed in the coding device.

Step S40: obtaining a reconstructed image block by performing image reconstruction according to the reconstructed feature data.

It should be noted that after obtaining the reconstructed feature data whose spatial size and number of channels are consistent with the image features corresponding to the original image, image reconstruction may be performed based on the reconstructed feature data to obtain the reconstructed image block.

Here, obtaining a reconstructed image block by performing image reconstruction according to the reconstructed feature data may involve performing synthesis transformation processing on the reconstructed feature data through a pre-constructed synthesis transform network to realize image reconstruction, thereby obtaining the reconstructed image block. The synthesis transform network may be a network constructed based on deep learning or a neural network.

For ease of understanding, the following description is provided with reference to FIG. 3, but does not limit the solution. FIG. 3 shows an overall framework for image compression. As shown in FIG. 3, at a coding device side: x is an input image, which is processed by a main coder (Analysis Transform Net) to generate a latent representation y. Directly coding y would require a high bit rate. Therefore, a context model (Context Model Net), a hyper encoder network (Hyper Encoder Net), and a hyper decoder network (Hyper Decoder Net) are introduced for prediction, obtaining a prediction result $\mu$ and a residual $resi=y-\mu$. A distribution parameter $\sigma$ of the residual is obtained through the hyper encoder network (Hyper Encoder Net) and a probability hyper decoder network (Hyper Scale Decoder Net). The distribution parameter helps entropy encoding to compress data with fewer bits. Thus, at the decoding side, a predicted mean $\mu$ and a distribution parameter $\sigma$ for each y must be obtained to perform entropy decoding correctly. A G-unit component scales the resi and distribution parameter $\sigma$ to control quantization loss. The resi undergoes rounding (Round) to obtain a quantized residual, denoted as $\hat{r}$. Finally, lossless entropy encoding (Lossless Encoder) is performed.

At a decoding device side: the image bitstream is entropy decoded to obtain $\cdot\hat{r}_{\cdot}$. An invG-unit component performs scaling on $\cdot\hat{r}_{\cdot}$, where scaling factors of the G-unit and invG-unit modules are inversely related. After scaling, the predicted value $\mu$ is combined with the scaled residual to obtain $\hat{y}$, which is input to a synthesis transform network (Synthesis Transform Net) at the decoding side to obtain the reconstructed image block.

In this embodiment, image residual data or extended residual data is extracted from an image bitstream, and a plurality of extended residual groups are obtained based on the extracted image residual data or extended residual data; respective image reconstruction features corresponding to the extended residual groups is obtained by performing residual restoration on each of the plurality of extended residual groups; reconstructed feature data is obtained by performing spatial resolution amplification processing on the respective image reconstruction features corresponding to the extended residual groups; and a reconstructed image block is obtained by performing image reconstruction according to the reconstructed feature data. Since the obtained extended residual data has undergone spatial resolution reduction processing, residual restoration processing can be performed on entire groups at a lower resolution, thereby improving the overall computational efficiency of residual restoration and reducing time complexity.

Figure 4:
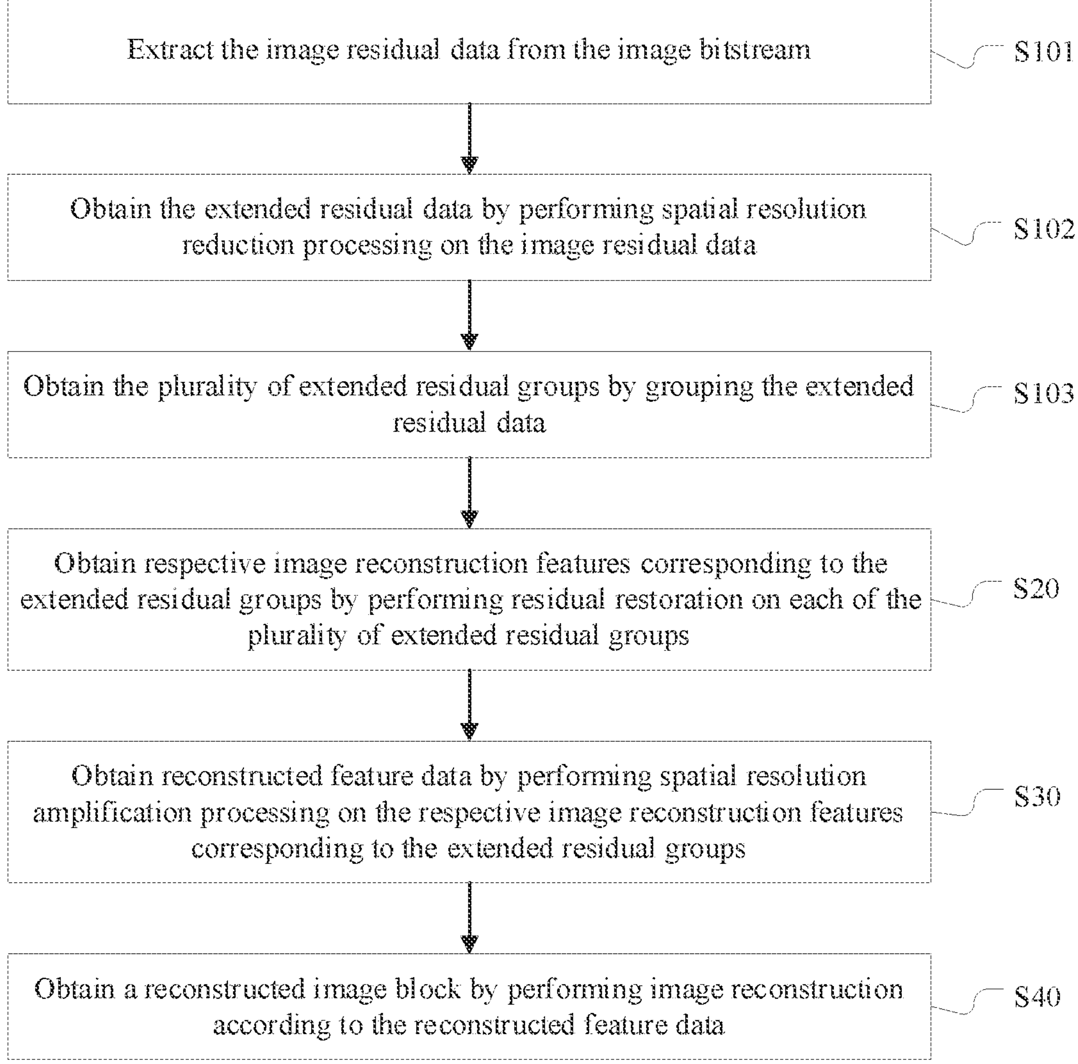
FIG. 4 is a schematic flowchart of a second embodiment of an image decoding method according to the present disclosure.

Referring to FIG. 4, which is a flowchart of a second embodiment of an image decoding method of the present disclosure.

Based on the first embodiment mentioned above, step S10 of the image decoding method in this embodiment includes the following steps.

Step S101: extracting the image residual data from the image bitstream.

It should be noted that the coding device may perform spatial resolution amplification processing on the generated extended residual data to restore it to image residual data whose spatial size and number of channels match those of an image feature corresponding to an original image. The image residual data is then coded into the image bitstream. In this case, when decoding the image bitstream, the decoding device can only extract image residual data from the image bitstream.

Step S102: obtaining the extended residual data by performing spatial resolution reduction processing on the image residual data.

It can be understood that to facilitate subsequent grouping processing and reduce time complexity, and after obtaining the image residual data, spatial resolution reduction processing may be performed on the image residual data to obtain the extended residual data. In order to ensure the accuracy of decoding, the methods used by the coding device and the decoding device when performing spatial resolution reduction processing need to be consistent, and the spatial resolution amplification processing is an inverse process of the spatial resolution reduction processing.

After spatial resolution reduction processing is performed on the image residual data, its spatial size becomes smaller. Correspondingly, when processing the image residual data, a smaller convolution kernel can be used. For example: if a convolution kernel with a size of 5×5 was used on the original image residual data, using a convolution kernel with a size of 3×3 after spatial resolution reduction processing would be equivalent in terms of receptive field.

In practical applications, the step of obtaining the extended residual data by performing spatial resolution reduction processing on the image residual data may include:

obtaining the extended residual data by reducing a spatial size corresponding to the image residual data and/or increasing a number of feature channels corresponding to the image residual data.

It should be noted that a reduction range of reducing the spatial size corresponding to the image residual data and an increase range of increasing the number of feature channels corresponding to the image residual data may be preset by the administrator of the decoding device, and this embodiment does not limit this.

In actual implementation, only the reduction range of spatial size may be set, or only the increase range of the number of feature channels may be set, and the decoding device can adaptively adjust the spatial size or the number of feature channels. Of course, it is also possible to set the reduction range of spatial size and the increase range of the number of feature channels for the device to execute without using device adaptation.

For example: assume an image feature corresponding to the image residual data is $y \in R^{(H,W,C)}$, where H is a height of the image feature, W is a width of the image feature, and C is the number of feature channels. In this case, H and W can be reduced to half of their original values. To keep the data volume unchanged, the number of feature channels becomes four times the original amount. Thus, the image feature corresponding to the obtained extended residual data can be expressed as $y \in R^{\{H/2,\ W/2,\ 4C\}}$.

In a specific implementation, spatial resolution reduction processing may be performed based on spatial information or frequency information corresponding to the image residual data, and the spatial resolution reduction processing may also be performed through a preset convolution layer. At this time, the step of obtaining the extended residual data by reducing a spatial size corresponding to the image residual data and/or increasing a number of feature channels corresponding to the image residual data in the embodiment may include:

obtaining the extended residual data by reducing the spatial size corresponding to the image residual data and/or increasing the number of feature channels corresponding to the image residual data according to spatial information corresponding to the image residual data;

or, obtaining the extended residual data by reducing the spatial size corresponding to the image residual data and/or increasing the number of feature channels corresponding to the image residual data according to frequency domain information corresponding to the image residual data;

or, obtaining the extended residual data by reducing the spatial size corresponding to the image residual data and/or increasing the number of feature channels corresponding to the image residual data according to a preset convolution layer.

Figure 5:
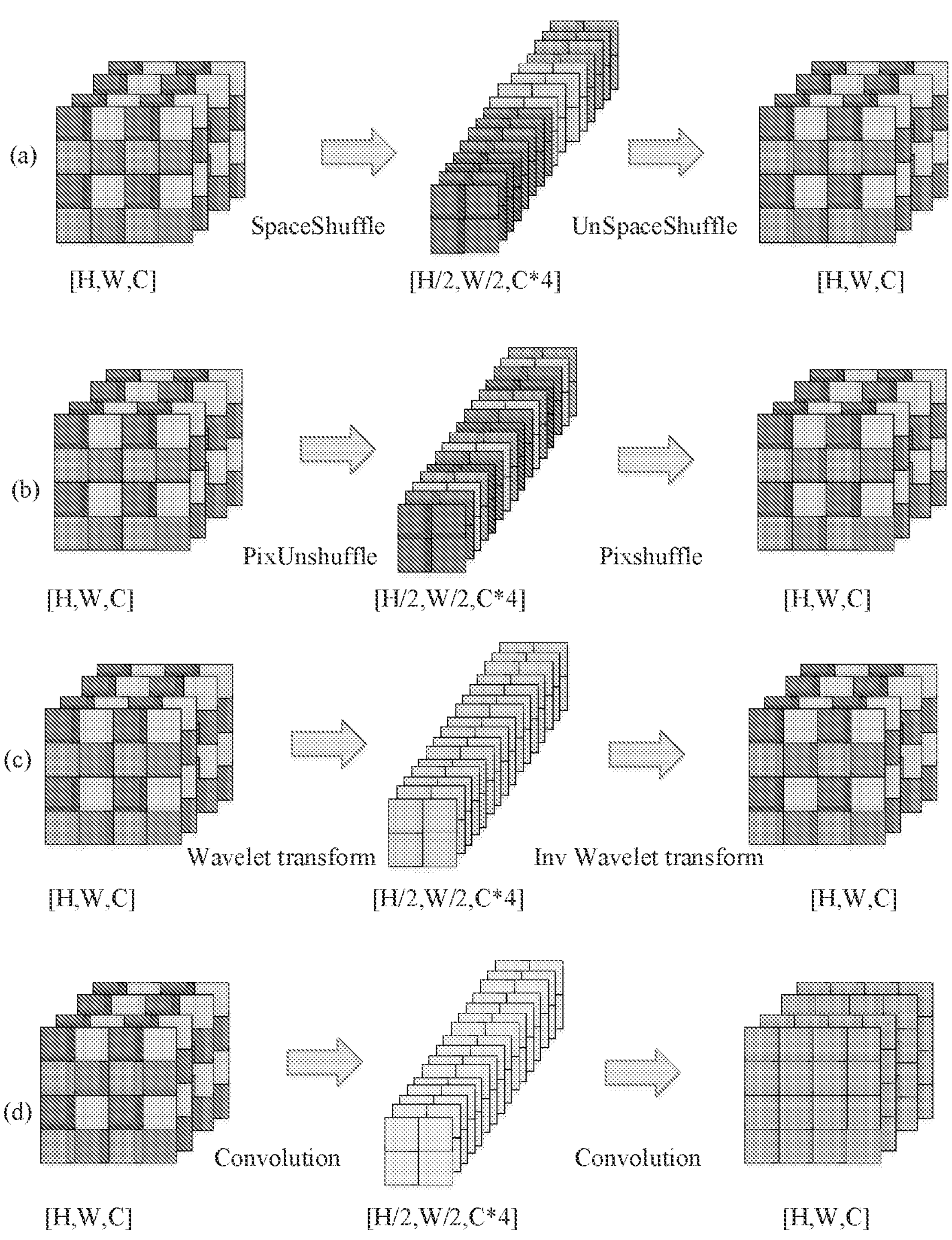
FIG. 5 is a schematic flowchart of spatial resolution processing according to an embodiment of the present disclosure.

For ease of understanding, the following description is provided with reference to FIG. 5, but does not limit the solution. FIG. 5 is a schematic diagram of a spatial resolution processing flow in this embodiment. As shown in manner (a) of FIG. 5, SpaceShuffle is one of the ways for spatial resolution reduction processing. Assuming an input to this process is a1∈R (H,W,C), and its output is a2∈R{H/2,W/2,4*C}, its mathematical expression is as follows:

$$a2[h, w, c] = a1[2*h, 2*w, c]$$

$$a2[h, w, C+c] = a1[2*h+1, 2*w+1, c]$$

$$a2[h, w, 2*C+c] = a1[2*h, 2*w+1, c]$$

$$a2[h, w, 3*C+c] = a1[2*h+1, 2*w, c]$$

where h represents an index value along a height dimension, with a range of 0 to H−1; w represents an index value along a width dimension, with a range of 0 to W−1; c represents an index value along a channel dimension, with a range of 0 to C−1. And a1[h,w,c] represents the value at the corresponding h, w, c index position in a1. In manner (a) of FIG. 5, unSpaceShuffle is an inverse process of SpaceShuffle and is one of the ways for spatial resolution amplification processing. After processing through both SpaceShuffle and unSpaceShuffle, the output remains identical to the original input, making this process lossless. The input and output of the aforementioned processing may also be other types of data, which is not limited by the embodiment of the present disclosure.

As shown in manner (b), manner (b) represents another way to perform spatial resolution processing according to spatial information corresponding to the image residual data. The specific sampling manner of PixShuffle is similar to manner (a), but differs in that data is interleaved along the channel dimension. It divides the data from one channel before processing into four channels based on spatial partitioning, arranged sequentially.

Manner (c) in FIG. 5 illustrates spatial resolution processing according to frequency domain information corresponding to the image residual data. As shown in manner (c), Wavelet transform is a two-dimensional wavelet transformation, enabling frequency domain partitioning of the data. It outputs four frequency domain sub-bands with dimensions (H/2, W/2, C], each representing different frequency domain characteristics. Inv Wavelet transform is its inverse process, which synthesizes the frequency-domain subbands into the original data, and this process is lossless.

Manner (d) in FIG. 5 is to perform spatial resolution processing according to a preset convolution layer. As shown in manner (d), Convolution represents convolutional transformation, where the input is directly processed through a convolution layer to obtain an output of [H/2,W/2,4*C], achieving the purpose of reducing spatial resolution. The corresponding inverse process also uses a convolution layer to restore the data to the original dimensions. However, this manner is lossy, as the data after both processing is different from the original data.

In a possible implementation of this embodiment, before performing spatial resolution reduction processing on the image residual data, the image residual data may be grouped, and then subjected to spatial resolution reduction processing respectively. In this case, step S102 described in this embodiment may include:

obtaining at least one image residual group by performing data grouping according to feature channels corresponding to the image residual data; and obtaining the extended residual data by performing spatial resolution reduction processing on data in the at least one image residual group.

It should be noted that the manner for grouping data according to feature channels corresponding to the image residual data may be the same as or similar to the manner used for grouping the extended residual data. Obtaining the extended residual data by performing spatial resolution reduction processing on data in the at least one image residual group may involve performing spatial resolution reduction processing on the data in the at least one image residual group respectively, and then aggregating the data after spatial resolution reduction processing, so as to obtain the extended residual data.

For example: assuming an image feature corresponding to the image residual data is $y \in R^{(H,W,C)}$, it may first be evenly divided into two groups based on feature channels. In this case, an image feature corresponding to the data in each image residual group can be expressed as $y \in R^{(H,W,C/2)}$.

Step S103: obtaining the plurality of extended residual groups by grouping the extended residual data.

It should be noted that obtaining the plurality of extended residual groups by grouping the extended residual data may involve uniformly dividing the extended residual data into multiple groups according to the corresponding feature channels. For example: assuming the total number of feature channels corresponding to the extended residual data is 20, the extended residual data corresponding to feature channels 1-10 may be grouped into one group, while the extended residual data corresponding to feature channels 11-20 may be grouped into another group. The number of uniformly divided groups may be preset by an administrator of the decoding device, and this embodiment does not limit this.

Certainly, non-uniform division may also be applied during specific grouping. Obtaining the plurality of extended residual groups by grouping the extended residual data based on feature channels corresponding to the extended residual data may also be performed according to a preset grouping rule, which divides the extended residual data into multiple groups based on their corresponding feature channels. The preset grouping rule may be set in advance by the administrator of the decoding device according to actual needs. For example: the preset grouping rule may be set to group the first m/n (where n is the total number of feature channels, and m is a preset value within the range [1, n)) of the extended residual data into one group, and the remaining extended residual data into another group.

In practical applications, when obtaining the plurality of extended residual groups by grouping the extended residual data based on feature channels corresponding to the extended residual data, extended residual data corresponding to a single feature channel may also be divided into one group. For example: assuming the total number of feature channels corresponding to the extended residual data is 20, the extended residual data may be divided into 20 groups based on the different feature channels.

In this embodiment, whether the extracted image residual data or extended residual data is detected before grouping. If it is image residual data, spatial resolution reduction processing will be performed first. This ensures that even if the image bitstream transmitted from the coding device includes image residual data, it can still be properly grouped and processed group by group after processing, thereby improving the versatility of the image decoding method in this embodiment.

Figure 6:
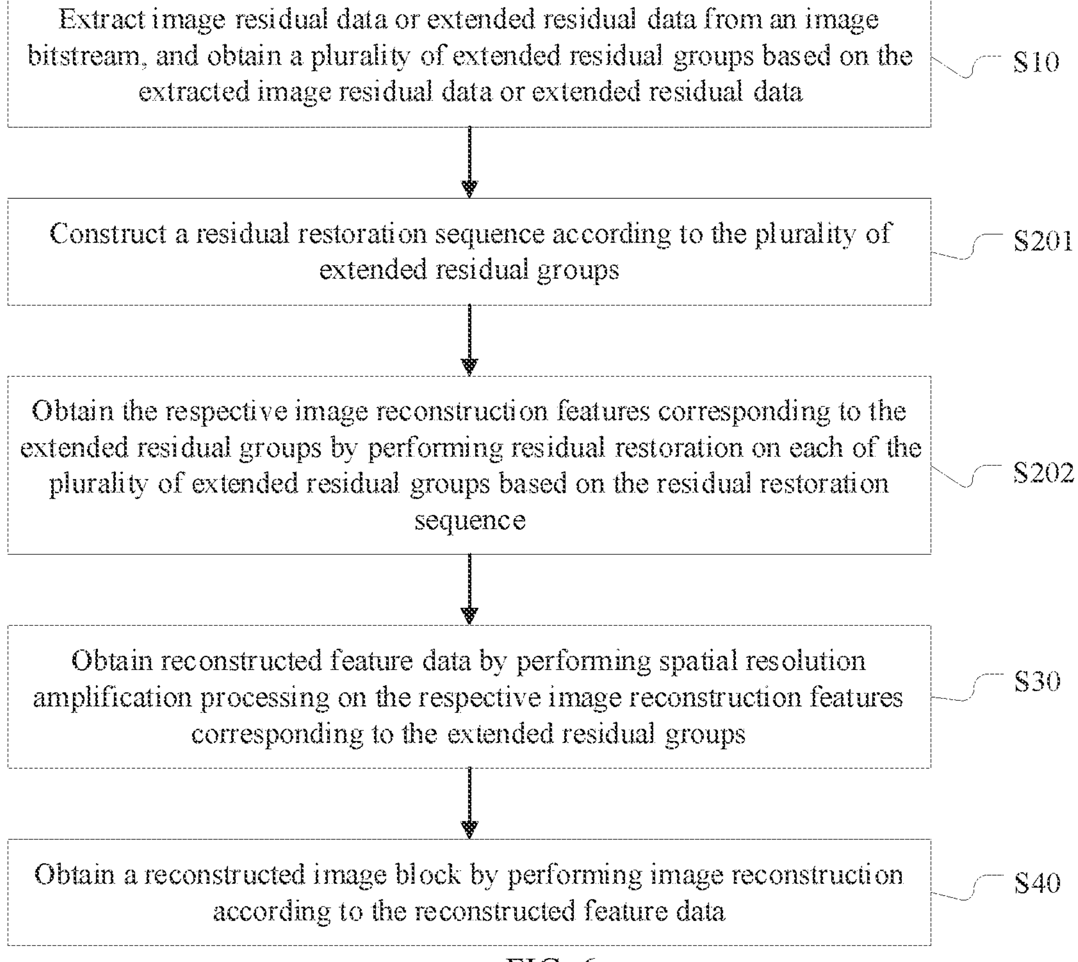
FIG. 6 is a schematic flowchart of a third embodiment of an image decoding method according to the present disclosure.

Referring to FIG. 6, which is a flowchart of a third embodiment of an image decoding method of the present disclosure.

Based on the first embodiment mentioned above, step S20 of the image decoding method in this embodiment includes:

Step S201: constructing a residual restoration sequence according to the plurality of extended residual groups.

It should be noted that after dividing into multiple extended residual groups, residual restoration can be performed group by group to reduce the time complexity of mean prediction during the image decoding process. At this time, in order to determine a residual restoration order of each extended residual group, a residual restoration sequence can be constructed based on the plurality of extended residual groups.

Step S202: obtaining the respective image reconstruction features corresponding to the extended residual groups by performing residual restoration on each of the plurality of extended residual groups based on the residual restoration sequence.

It should be noted that performing residual restoration on each of the plurality of extended residual groups based on the residual restoration sequence may involve sequentially performing residual restoration on each of the plurality of extended residual groups according to a sequence order in the residual restoration sequence.

In practical applications, residual restoration can be performed sequentially through sequence traversal. In this case, step S202 in this embodiment may include:

obtaining a current extended residual group by traversing the residual restoration sequence;

acquiring auxiliary information output by an auxiliary coding network;

constructing prior information according to the auxiliary information;

obtaining an image reconstruction feature corresponding to the current extended residual group by performing residual restoration on the current extended residual group based on the prior information; and obtaining the respective image reconstruction features corresponding to the extended residual groups upon a completion of the traversing.

It should be noted that obtaining a current extended residual group by traversing the residual restoration sequence may involve traversing the residual restoration sequence and taking the traversed extended residual group as the current extended residual group. The auxiliary coding network may be an auxiliary network shown in FIG. 3 (e.g., Hyper Encoder Net or Hyper Decoder Net).

In practical applications, obtaining an image reconstruction feature corresponding to the current extended residual group by performing residual restoration on the current extended residual group based on the prior information may involve processing the prior information through a prediction fusion network (Prediction Fusion Net) to obtain a predicted mean, which is then added to a residual in the current extended residual group to achieve residual restoration and obtain the image reconstruction feature corresponding to the current extended residual group.

In practical applications, the step of constructing prior information according to the auxiliary information in this embodiment may include:

obtaining extended auxiliary information;

determining whether the current extended residual group is a first element in the residual restoration sequence;

when the current extended residual group is the first element, constructing the prior information according to the extended auxiliary information; or when the current extended residual group is not the first element, obtaining concatenated auxiliary information by concatenating the extended auxiliary information with a convolution processing result corresponding to an image reconstruction feature of a restored extended residual group; and constructing the prior information based on the concatenated auxiliary information.

It should be noted that a spatial size and number of feature channels of the auxiliary information output by the auxiliary coding network are consistent with those of the original image. However, the extended residual data has undergone spatial resolution reduction processing. Therefore, to ensure successful channel concatenation, the auxiliary information needs to be processed first to obtain extended auxiliary information, which is then used to construct the prior information.

When constructing the prior information according to the extended auxiliary information, to improve the accuracy of mean prediction, the prior information can also be constructed by combining image features corresponding to previously reconstructed extended residual group(s). If the current extended residual group is the first element in the residual restoration sequence, it means that it is the first group to undergo residual restoration, at this time, there is no reconstructed extended residual group. Therefore, the prior information can be directly constructed based on the extended auxiliary information.

If the current extended residual group is not the first element in the residual restoration sequence, there is an extended residual group that has been reconstructed at this time. In this case, an image reconstruction feature of a restored extended residual group can be convolved through a convolution layer, and then the extended auxiliary information can be concatenated with a convolution processing result corresponding to the image reconstruction feature of the restored extended residual group along the channel dimension, and then the prior information can be constructed according to the concatenated auxiliary information. When constructing the prior information and selecting the restored extended residual groups, all the restored extended residual groups can be selected, or only a part of the restored extended residual groups can be selected.

In a possible implementation of this embodiment, when performing result concatenation, the image reconstruction feature of the restored extended residual group may be enhanced first to further improve the prediction effect. The step of obtaining concatenated auxiliary information by concatenating the extended auxiliary information with a convolution processing result corresponding to an image reconstruction feature of a restored extended residual group may include:

acquiring the image reconstruction feature corresponding to the restored extended residual group;

obtaining an enhanced reconstruction feature by performing feature enhancement on the image reconstruction feature; and obtaining the concatenated auxiliary information by concatenating the auxiliary information with a convolution processing result corresponding to the enhanced reconstruction feature.

In practical applications, obtaining an enhanced reconstruction feature by performing feature enhancement on the image reconstruction feature may involve performing operations such as missing value processing and outlier processing on the image reconstruction feature.

It can be understood that, before concatenating the auxiliary information with the image reconstruction feature, the image reconstruction feature is first enhanced to obtain the enhanced reconstruction feature. This can increase the reliability of the enhanced reconstruction feature, thereby improving the reliability of the prior information and making the mean prediction based on the prior information more accurate.

In practical applications, when feature enhancement is performed on the image reconstruction feature corresponding to the restored extended residual group, a predicted mean, auxiliary information, image residual data and/or residual data variance corresponding to the restored extended residual group can be adopted, so the step of obtaining an enhanced reconstruction feature by performing feature enhancement on the image reconstruction feature in this embodiment may include:

acquiring a predicted mean, auxiliary information, image residual data, and/or residual data variance corresponding to the restored extended residual group; and obtaining the enhanced reconstruction feature by performing feature enhancement on the image reconstruction feature based on the predicted mean, auxiliary information, image residual data, and/or residual data variance corresponding to the restored extended residual group.

It should be noted that the predicted mean corresponding to the restored extended residual group is a value obtained during mean prediction when performing residual restoration on the restored extended residual group. The residual data variance may be a variance value of the image residual data corresponding to the restored extended residual group.

In a possible implementation of this embodiment, in order to improve reconstruction quality of image reconstruction, step S30 of this embodiment may include:

obtaining respective enhanced reconstruction features corresponding to the extended residual groups by performing feature enhancement on the respective image reconstruction features corresponding to the extended residual groups; and obtaining the reconstructed feature data by performing spatial resolution amplification processing on the respective enhanced reconstruction feature corresponding to the extended residual groups.

It should be noted that obtaining an enhanced reconstruction feature corresponding to an extended residual group by performing feature enhancement on an image reconstruction feature corresponding to the extended residual group may involve performing feature enhancement on the image reconstruction feature corresponding to the extended residual group using a predicted mean, auxiliary information, image residual data, and/or residual data variance corresponding to the extended residual group.

It can be understood that before obtaining the reconstructed feature data by performing spatial resolution amplification processing on the respective image reconstruction features corresponding to the extended residual groups, firstly, feature enhancement is performed on the respective image reconstruction features corresponding to the extended residual groups, and then spatial resolution amplification processing is performed on the respective enhanced reconstruction feature corresponding to the extended residual groups to obtain the reconstructed feature data. This ensures that the reliability of the ultimately constructed reconstructed feature data is higher, and the quality of the reconstructed image blocks obtained by subsequent image reconstruction is better.

Figure 7:
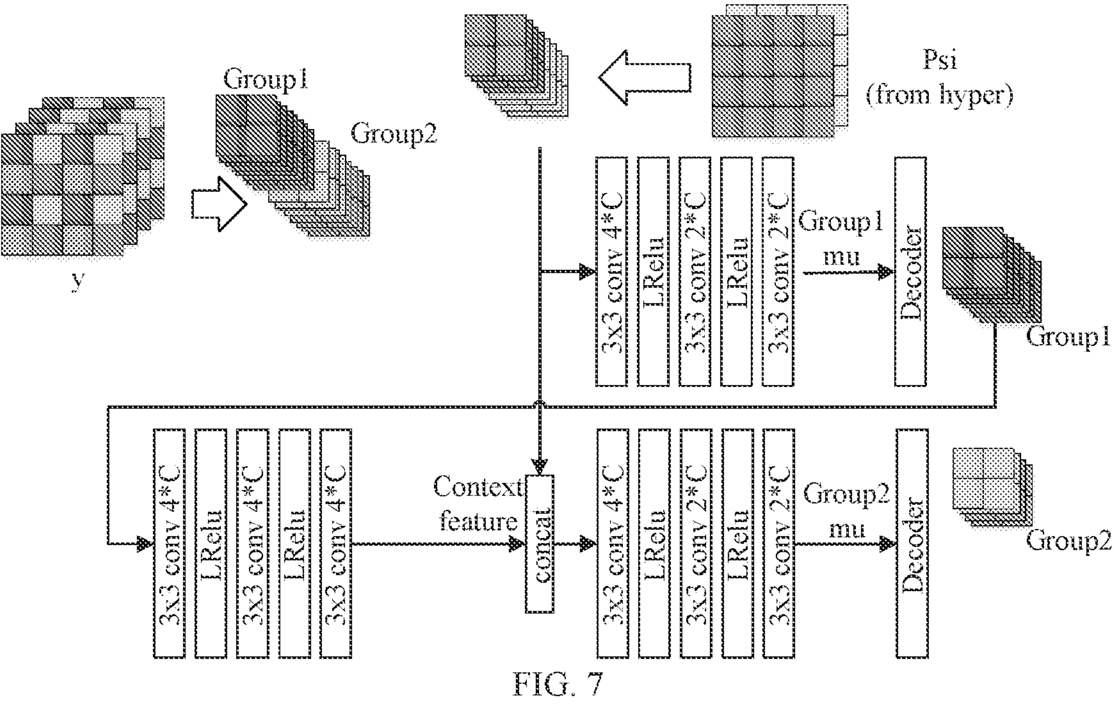
FIG. 7 is a schematic flowchart of an execution flow of image decoding grouping according to an embodiment of the present disclosure.
Figure 8:
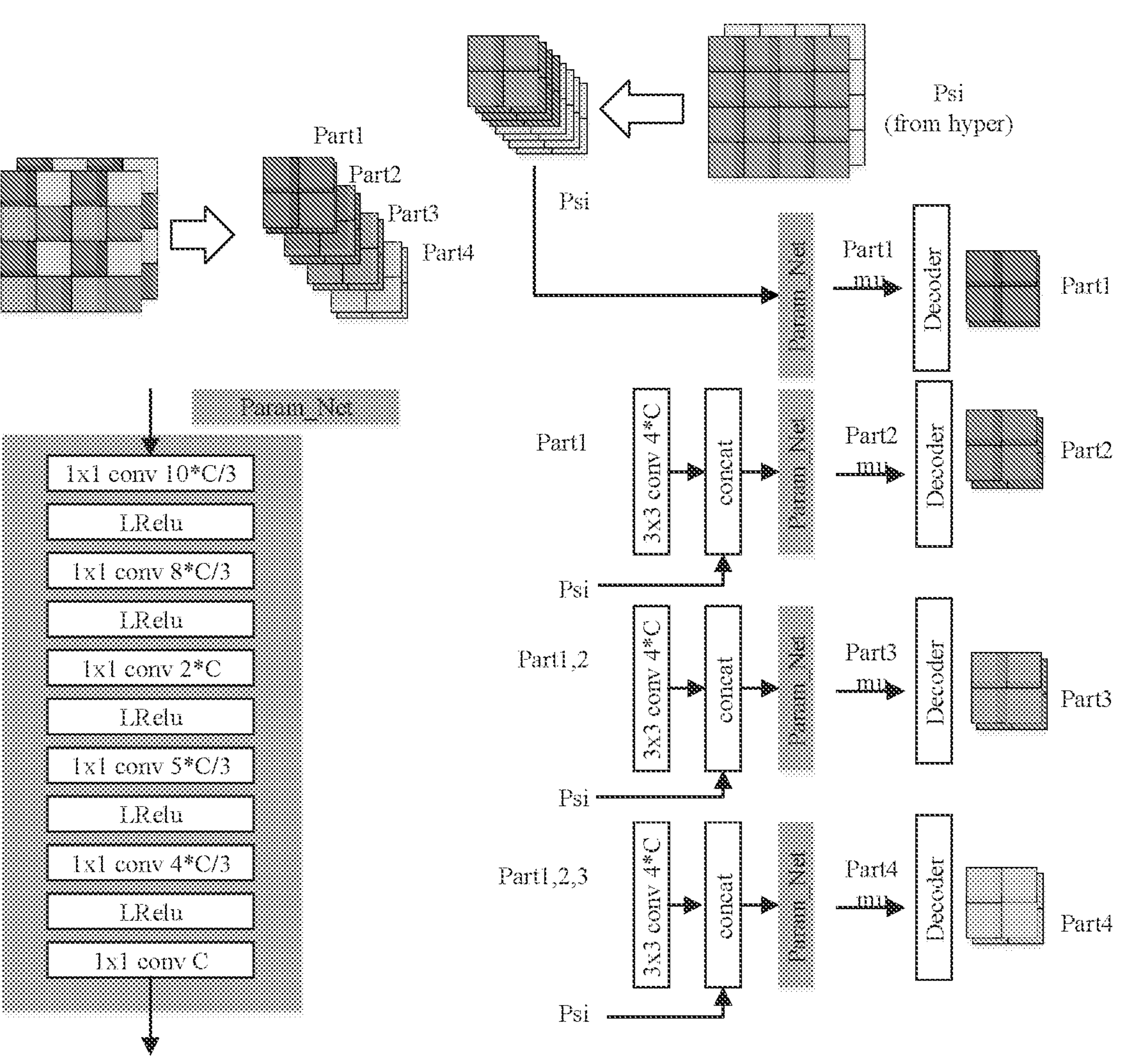
FIG. 8 is a schematic flowchart of an execution flow of secondary grouping according to an embodiment of the present disclosure.
Figure 9:
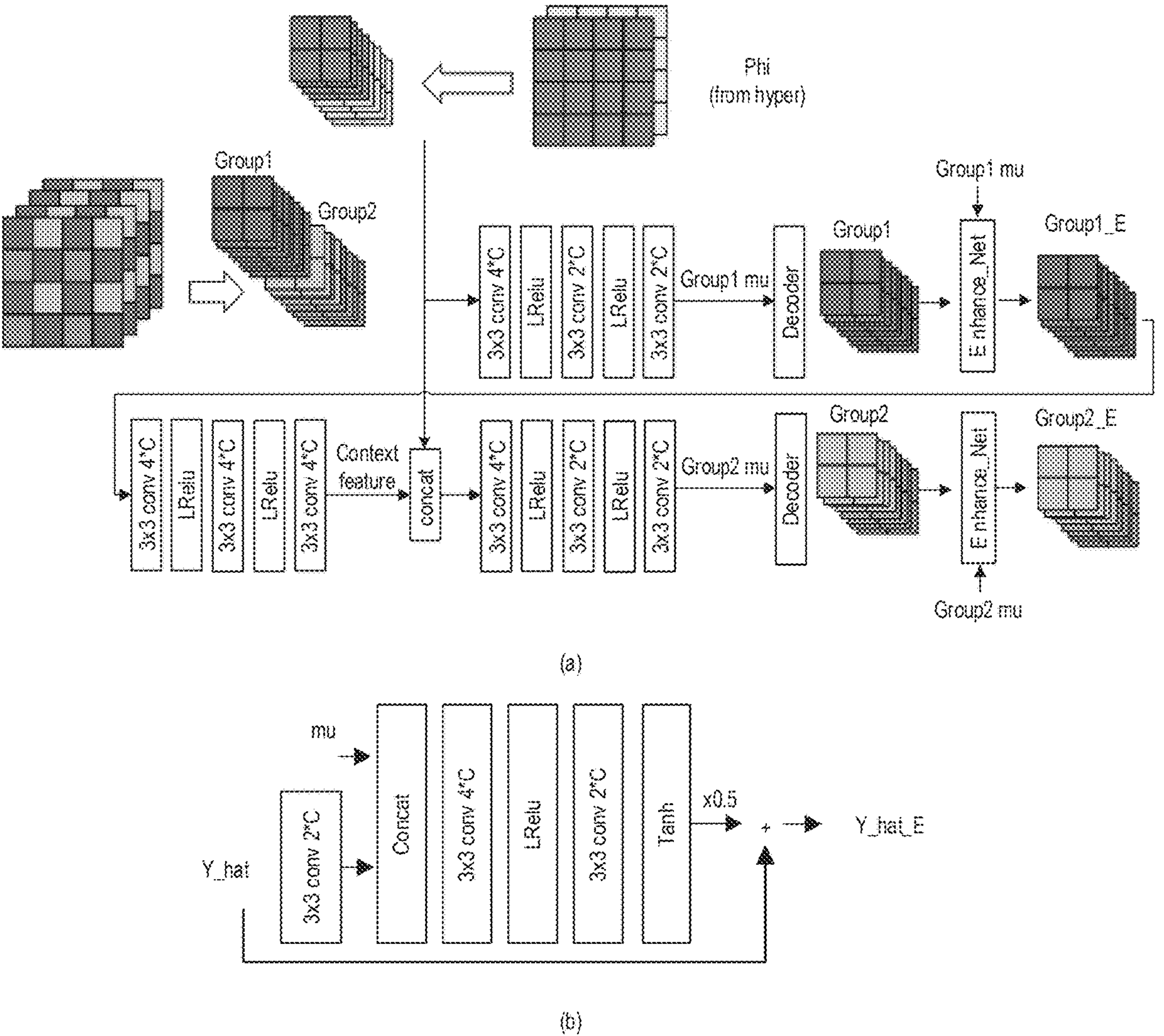
FIG. 9 is a schematic flowchart of an execution flow of feature enhancement grouping according to an embodiment of the present disclosure.

For ease of understanding, the following description is provided with reference to FIGS. 7, 8, and 9, but does not limit the solution. FIG. 7 is a schematic flowchart of an execution flow of image decoding grouping according to an embodiment of the present disclosure. FIG. 8 is a schematic flowchart of an execution flow of secondary grouping according to an embodiment of the present disclosure. FIG. 9 is a schematic flowchart of an execution flow of feature enhancement grouping according to an embodiment of the present disclosure.

As shown in FIG. 7, an image feature corresponding to image residual data is $y \in R^{(H,W,C)}$ It first undergoes spatial resolution reduction processing, resulting in $y \in R^{(H/2,W/2,4C)}$ This can then be divided into two groups (group1 and group2). Subsequently, a residual restoration sequence (group1-group2) is constructed. Then, using auxiliary (Psi) information processed through a network, a mean value mu for Group1 is obtained, yielding an image reconstruction feature for Group1. The image reconstruction feature for Group1 are used to extract features and concatenated with Psi along the channel dimension. A mean value mu of Group2 is obtained through the network, and then the Group2 is obtained through decoding. Combine Group1 with Group2 to perform concatenating along the channel dimension, followed by a specific spatial resolution amplification processing (i.e., the inverse process of spatial resolution reduction processing), to obtain the reconstructed feature data. Image reconstruction is then performed based on the reconstructed feature data.

If grouping is performed once before spatial resolution reduction processing, the execution flow is shown in FIG. 8. An image feature corresponding to image residual data is $Y \in R^{(H,W,C)}$. It is first evenly divided into y1 and y2 based on the corresponding feature channels, and then $y1 \in R^{(H,W,C/2)}$. At this time, spatial resolution reduction is performed respectively, and y1 is divided into part1, part2, part3, and part4, where:

- Part1 represents the data in y1 at spatial positions with even row indices and even column indices in y1's spatial indexing, containing all channel information.
- Part2 represents the data in y1 at spatial positions with odd row indices and odd column indices in y1's spatial indexing, containing all channel information.
- Part3 represents the data in y1 at spatial positions with even row indices and odd column indices in y1's spatial indexing, containing all channel information.
- Part4 represents the data in y1 at spatial positions with odd row indices and even column indices in y1's spatial indexing, containing all channel information.

Similarly, y2 can be divided into four analogous parts: part5, part6, part7, and part8. A residual restoration sequence "part1-part2-part3-part4-part5-part6-part7-part8" is then constructed. At this time, when performing residual restoration on part1, prior information can be generated directly from the auxiliary information. When performing residual restoration on part2, prior information can be generated based on the image reconstruction feature of part1 and the auxiliary information. When performing residual restoration on part3, prior information can be generated based on the image reconstruction features of part1 and part2 and the auxiliary information, and so forth, until the image reconstruction features for all parts are obtained.

Of course, two separate residual restoration sequences can be constructed for y1 and y2, namely "part1-part2-part3-part4" and "part5-part6-part7-part8". At this time, the image of y1 can be reconstructed according to the residual restoration sequence composed of part1-4 by using a similar process as above. Obtain the image reconstruction feature corresponding to each part in y1, then generate prior information according to the image reconstruction features corresponding to y1 and the auxiliary information, and then reconstruct y2 according to the residual restoration sequence composed of part 5-8 and the generated prior information to obtain the image reconstruction feature corresponding to each part in y2.

Since y was first split into y1 and y2 before separate spatial resolution reduction processing, after obtaining the image reconstruction feature corresponding to each part in y1 and y2, spatial resolution amplification processing can be applied separately to the image reconstruction feature corresponding to each part in y 1 and y2. The results are then aggregated to obtain the complete reconstructed feature data.

If feature enhancement is performed after grouping, the specific execution flow is shown in FIG. 9 (*a*). An image feature corresponding to image residual data is $y \in R^{(H,W,C)}$. It first undergoes spatial resolution reduction processing, resulting in $y \in R^{(H/2,W/2,4C)}$ This can then be divided into two groups (group1 and group2). Subsequently, using auxiliary (Psi) information processed through a network, a mean value mu for Group1 is obtained, yielding an image reconstruction feature for Group1. The image reconstruction feature of Group1 is then enhanced using the predicted mean corresponding to Group1, resulting in an enhanced image feature Group1_E. Next, features are extracted from the enhanced image feature Group1_B and concatenated with Psi along the channel dimension. This concatenated result is processed through a network to obtain a mean mu for Group2, which is then decoded to obtain an image reconstruction feature for Group2. The image reconstruction feature of Group2 is then enhanced based on the mean mu of Group2, resulting in the enhanced image feature Group2_E. Group1_E and Group2_E are then concatenated along the channel dimension, followed by a specific spatial resolution amplification processing (i.e., the inverse process of spatial resolution reduction processing), to obtain the reconstructed feature data. Image reconstruction is then performed based on the reconstructed feature data. During feature enhancement in FIG. 9 (*a*), a specific structure of the network used for feature enhancement (Enhance Net) is shown in FIG. 9 (*b*).

In this embodiment, a residual restoration sequence is constructed according to the plurality of extended residual groups, and the respective image reconstruction features corresponding to the extended residual groups is obtained by performing residual restoration on each of the plurality of extended residual groups based on the residual restoration sequence. Since the residual restoration sequence is constructed according to a plurality of extended residual groups, a sequence of residual restoration can be determined through the residual restoration sequence, so that whether there is a restored extended residual group can be quickly determined, and when there is a restored extended residual group, more accurate prior information can be constructed according to the image feature data corresponding to the restored extended residual group.

An embodiment of the present disclosure provides an image coding method, referring to FIG. 10, which is a flowchart of a first embodiment of an image coding method of the present disclosure.

In this embodiment, the coding method includes the following steps:

Step S100: obtaining extended image features by performing spatial resolution reduction processing on an image feature corresponding to a to-be-coded image.

It should be noted that to facilitate subsequent grouping processing and reduce time complexity, and after obtaining the image feature corresponding to the to-be-coded image, spatial resolution reduction processing may be performed on the image feature to obtain the extended image features. The to-be-coded image is the original image mentioned in the embodiments of the image decoding method.

After spatial resolution reduction processing is performed on the image feature, its spatial size becomes smaller. Correspondingly, when processing the image features, a smaller convolution kernel can be used. For example: if a convolution kernel with a size of 5×5 was used on the original image feature, using a convolution kernel with a size of 3×3 after spatial resolution reduction processing would be equivalent in terms of receptive field.

In a possible implementation of this embodiment, step S100 may include:

obtaining the extended image features by reducing a spatial size corresponding to the image feature of the to-be-coded image and/or increasing a number of feature channels corresponding to the image feature.

It should be noted that a reduction range of reducing the spatial size corresponding to the image feature and an increase range of increasing the number of feature channels corresponding to the image feature may be preset by the administrator of the decoding device, and this embodiment does not limit this.

In actual implementation, only the reduction range of spatial size may be set, or only the increase range of the number of feature channels may be set, and the decoding device can adaptively adjust the spatial size or the number of feature channels. Of course, it is also possible to set the reduction range of spatial size and the increase range of the number of feature channels for the device to execute without using device adaptation.

In a specific implementation, spatial resolution reduction processing may be performed based on spatial information or frequency information corresponding to the image feature, and the spatial resolution reduction processing may also be performed through a preset convolution layer. At this time, the step of obtaining the extended image features by reducing a spatial size corresponding to the image feature of the to-be-coded image and/or increasing a number of feature channels corresponding to the image feature in the embodiment may include:

obtaining the extended image features by reducing the spatial size corresponding to the image feature and/or increasing the number of feature channels corresponding to the image feature according to spatial information corresponding to the image feature of the to-be-coded image;

or, obtaining the extended image features by reducing the spatial size corresponding to the image feature and/or increasing the number of feature channels corresponding to the image feature according to frequency domain information corresponding to the image feature of the to-be-coded image;

or, obtaining the extended image features by reducing the spatial size corresponding to the image feature and/or increasing the number of feature channels corresponding to the image feature according to a preset convolution layer.

For specific implementations, reference may be made to the explanatory section of FIG. 5 in the aforementioned image decoding method embodiment, which will not be repeated here.

Step S200: obtaining a plurality of extended feature groups by grouping the extended image features.

In a specific implementation, when grouping the extended image features, reference may be made to feature channels corresponding to each extended image feature. In this case, step S200 may include:

obtaining the plurality of extended feature groups by grouping the extended image features based on feature channels corresponding to the extended image features.

It should be noted that obtaining the plurality of extended feature groups by grouping the extended image features based on feature channels corresponding to the extended image features may involve uniformly dividing the extended image features into multiple groups according to the corresponding feature channels. For example: assuming the total number of feature channels corresponding to the extended image features is 20, the extended image features corresponding to feature channels 1-10 may be grouped into one group, while the extended image features corresponding to feature channels 11-20 may be grouped into another group. The number of uniformly divided groups may be preset by an administrator of the decoding device, and this embodiment does not limit this.

Certainly, non-uniform division may also be applied during specific grouping. Obtaining the plurality of extended feature groups by grouping the extended image features based on feature channels corresponding to the extended image features may also be performed according to a preset grouping rule, which divides the extended image features into multiple groups based on their corresponding feature channels. The preset grouping rule may be set in advance by the administrator of the coding device according to actual needs. For example: the preset grouping rule may be set to group the first m/n (where n is the total number of feature channels, and m is a preset value within the range [1, n)) of the extended image features into one group, and the remaining extended image features into another group.

In practical applications, when obtaining the plurality of extended feature groups by grouping the extended image features based on feature channels corresponding to the extended image features, extended image features corresponding to a single feature channel may also be divided into one group. For example: assuming the total number of feature channels corresponding to the extended image features is 20, the extended image features may be divided into 20 groups based on the different feature channels.

Step S300: obtaining respective image residual data corresponding to the extended feature groups by performing residual calculation on each of the plurality of extended feature groups.

It should be noted that obtaining image residual data corresponding to an extended feature group by performing residual calculation on the extended feature groups may involve performing mean prediction on the extended feature group, and then subtracting the predicted mean value from an image feature in the extended feature group, thereby obtaining the image residual data corresponding to the extended feature group.

Step S400: generating an image bitstream according to the image residual data, and sending the image bitstream to an image decoding device.

It should be noted that generating an image bitstream according to the image residual data may involve writing the image residual data into the image bitstream through entropy encoding.

In a possible implementation of this embodiment, before performing spatial resolution reduction processing on the image feature corresponding to the to-be-coded image, the image feature may first be grouped, and then subjected to spatial resolution reduction processing respectively. In this case, step S100 described in this embodiment may include;

- acquiring the image feature corresponding to the to-be-coded image;
- obtaining at least one image feature group by grouping the image feature based on feature channels corresponding to the image feature; and
- obtaining the extended image features by performing spatial resolution reduction processing on data in the at least one image feature group.

In a possible implementation of this embodiment, obtaining extended image features by performing spatial resolution reduction processing on an image feature corresponding to a to-be-coded image may also involve acquiring the image feature corresponding to the to-be-coded image and then performing spatial resolution reduction processing on data within the image feature to obtain the extended image features. It should be noted that acquiring the image feature corresponding to the to-be-coded image may be done by extracting the image feature corresponding to the to-be-coded image through a preset feature extraction network. The manner for grouping data according to feature channels corresponding to the image feature may be the same as or similar to the manner used for grouping the extended image features.

In a possible implementation of this embodiment, step S400 may include:

- obtaining image residual data corresponding to the to-be-coded image by performing spatial resolution amplification processing on the image residual data corresponding to the each extended feature group; and
- generating an image bitstream according to the image residual data corresponding to the to-be-coded image, and sending the image bitstream to the image decoding device.

It should be noted that the spatial resolution amplification processing may be an inverse process of the spatial resolution reduction processing described above. After obtaining the image residual data corresponding to each extended feature group, spatial resolution amplification processing may be performed on the image residual data to restore their spatial size and number of channels to match those of the image feature corresponding to the to-be-coded image, thereby obtaining the image residual data corresponding to the to-be-coded image. Subsequently, entropy encoding is performed on the image residual data to generate the image bitstream, which is then sent to the image decoding device.

In this embodiment, extended image features is obtained by performing spatial resolution reduction processing on an image feature corresponding to a to-be-coded image; a plurality of extended feature groups is obtained by grouping the extended image features; respective image residual data corresponding to the extended feature groups is obtained by performing residual calculation on each of the plurality of extended feature groups; and an image bitstream is generated according to the image residual data, and the image bitstream is sent to an image decoding device. By performing spatial resolution reduction processing on the acquired image feature of the to-be-coded image and then grouping it into multiple extended feature groups, residual calculation processing can be performed on entire groups at a lower resolution, thereby improving the overall computational efficiency of residual calculation and reducing time complexity.

Referring to FIG. 11, which is a flowchart of a second embodiment of an image coding method of the present disclosure.

Based on the first embodiment mentioned above, step S300 of the image coding method in this embodiment includes:

Step S3001: constructing a residual calculation sequence according to the plurality of extended feature groups.

It should be noted that after dividing into multiple extended feature groups, residual calculation can be performed on entire groups. To determine a residual calculation order of each extended feature group, a residual calculation sequence can be constructed based on the plurality of extended feature groups.

Step S3002: obtaining the respective image residual data corresponding to the extended feature groups by performing residual calculation on each of the plurality of extended feature groups based on the residual calculation sequence.

It should be noted that performing residual calculation on each of the plurality of extended feature groups based on the residual calculation sequence may involve sequentially performing residual calculation on each of the plurality of extended feature groups according to a sequence order in the residual calculation sequence.

In practical applications, residual calculation can be performed sequentially through sequence traversal. In this case, step S3002 in this embodiment may include:

- obtaining a current extended feature group by traversing the residual calculation sequence;
- acquiring auxiliary information output by an auxiliary coding network;
- constructing prior information according to the auxiliary information;
- obtaining image residual data corresponding to the current extended feature group by performing residual calculation on the current extended feature group based on the prior information; and
- obtaining the respective image residual data corresponding to the extended feature groups upon a completion of the traversing.

It should be noted that obtaining a current extended feature group by traversing the residual calculation sequence may involve traversing the residual calculation sequence and taking the traversed extended feature group as the current extended feature group. The auxiliary coding network may be an auxiliary network shown in FIG. 3 (e.g., Hyper Encoder Net or Hyper Decoder Net).

In practical applications, obtaining image residual data corresponding to the current extended feature group by performing residual calculation on the current extended feature group based on the prior information may involve processing the prior information through a Prediction Fusion Net to obtain a predicted mean, and then subtracting the predicted mean from the features in the current extended feature group to achieve residual calculation and obtain the image residual data corresponding to the current extended feature group.

When constructing prior information according to the auxiliary information, to improve the accuracy of mean prediction, the image features corresponding to previously processed extended feature groups that have undergone residual calculation may also be incorporated during prior information construction. The specific implementation is the same as that applied in the image decoding process, and the specific implementation steps may refer to the method of constructing prior information according to the auxiliary information provided in any of the aforementioned image decoding method embodiments.

In this embodiment, a residual calculation sequence is constructed according to the plurality of extended feature groups, and the respective image residual data corresponding to the extended feature groups is obtained by performing residual calculation on each of the plurality of extended feature groups based on the residual calculation sequence. Since the residual calculation sequence is constructed according to a plurality of extended feature groups, a sequence of residual calculation can be determined through the residual calculation sequence, so that whether there is a calculated extended feature group can be quickly determined, and when there is a calculated extended feature group, more accurate prior information can be constructed according to a convolution processing result corresponding to the image residual data of the calculated extended feature group.

In addition, an embodiment of the present disclosure further provides a storage medium, on which an image decoding and/or image coding program is stored, where the image decoding program, when executed by at least one processor, causes the at least one processor to perform the steps of the image decoding method as described above, and the image coding program, when executed by the at least one processor, causes the at least one processor to perform the steps of the image coding method as described above.

Figures 12, 13:
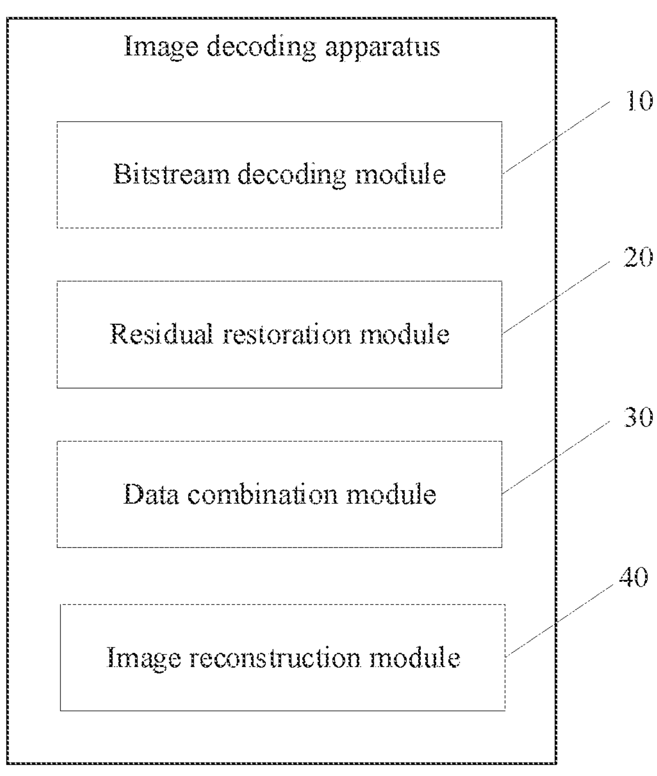
FIG. 12 is a structural block diagram of a first embodiment of an image decoding apparatus according to the present disclosure.
FIG. 13 is a structural block diagram of a first embodiment of an image coding apparatus according to the present disclosure.

Referring to FIG. 12, FIG. 12 is a structural block diagram of a first embodiment of an image decoding apparatus of the present disclosure.

As shown in FIG. 12, the image decoding apparatus proposed by an embodiment of the present disclosure includes:

- a bitstream decoding module 10, configured to extract image residual data or extended residual data from an image bitstream, and obtain a plurality of extended residual groups based on the extracted image residual data or extended residual data;
- a residual restoration module 20, configured to obtain respective image reconstruction features corresponding to the extended residual groups by performing residual restoration on each of the plurality of extended residual groups;
- a data combination module 30, configured to obtain reconstructed feature data by performing spatial resolution amplification processing on the respective image reconstruction features corresponding to the extended residual groups; and
- an image reconstruction module 40, configured to obtain a reconstructed image block by performing image reconstruction according to the reconstructed feature data.

In this embodiment, image residual data or extended residual data is extracted from an image bitstream, and a plurality of extended residual groups are obtained based on the extracted image residual data or extended residual data; respective image reconstruction features corresponding to the extended residual groups is obtained by performing residual restoration on each of the plurality of extended residual groups; reconstructed feature data is obtained by performing spatial resolution amplification processing on the respective image reconstruction features corresponding to the extended residual groups; and a reconstructed image block is obtained by performing image reconstruction according to the reconstructed feature data. Since the obtained extended residual data has undergone spatial resolution reduction processing, residual restoration processing can be performed on entire groups at a lower resolution, thereby improving the overall computational efficiency of residual restoration and reducing time complexity.

In a possible implementation of this embodiment, the bitstream decoding module 10 is further configured to: extract the extended residual data from the image bitstream; and obtain the plurality of extended residual groups by grouping the extended residual data based on feature channels corresponding to the extended residual data.

In a possible implementation of this embodiment, the bitstream decoding module 10 is further configured to: extract the image residual data from the image bitstream; obtain the extended residual data by performing spatial resolution reduction processing on the image residual data, where the spatial resolution amplification processing is an inverse process of the spatial resolution reduction processing; and obtain the plurality of extended residual groups by grouping the extended residual data.

In a possible implementation of this embodiment, the bitstream decoding module 10 is further configured to: obtain at least one image residual group by performing data grouping according to feature channels corresponding to the image residual data; and obtain the extended residual data by performing spatial resolution reduction processing on data in the at least one image residual group.

In a possible implementation of this embodiment, the bitstream decoding module 10 is further configured to: obtain the extended residual data by reducing a spatial size corresponding to the image residual data and/or increasing a number of feature channels corresponding to the image residual data.

In a possible implementation of this embodiment, the bitstream decoding module 10 is further configured to: obtain the extended residual data by reducing the spatial size corresponding to the image residual data and/or increasing the number of feature channels corresponding to the image residual data according to spatial information corresponding to the image residual data; or, obtain the extended residual data by reducing the spatial size corresponding to the image residual data and/or increasing the number of feature channels corresponding to the image residual data according to frequency domain information corresponding to the image residual data, or, obtain the extended residual data by reducing the spatial size corresponding to the image residual data and/or increasing the number of feature channels corresponding to the image residual data according to a preset convolution layer.

In a possible implementation of this embodiment, the residual restoration module 20 is further configured to: construct a residual restoration sequence according to the plurality of extended residual groups; and obtain the respective image reconstruction features corresponding to the extended residual groups by performing residual restoration on each of the plurality of extended residual groups based on the residual restoration sequence.

In a possible implementation of this embodiment, the residual restoration module 20 is further configured to: obtain a current extended residual group by traversing the residual restoration sequence; acquire auxiliary information output by an auxiliary coding network; constructing prior information according to the auxiliary information; obtain an image reconstruction feature corresponding to the current extended residual group by performing residual restoration on the current extended residual group based on the prior information; and obtain the respective image reconstruction features corresponding to the extended residual groups upon a completion of the traversing.

In a possible implementation of this embodiment, the residual restoration module 20 is further configured to: obtain extended auxiliary information; determine whether the current extended residual group is a first element in the residual restoration sequence; when the current extended residual group is the first element, construct the prior information according to the extended auxiliary information; or when the current extended residual group is not the first element, obtain concatenated auxiliary information by concatenating the extended auxiliary information with a convolution processing result corresponding to an image reconstruction feature of a restored extended residual group; and construct the prior information based on the concatenated auxiliary information.

In a possible implementation of this embodiment, the residual restoration module 20 is further configured to: acquire the image reconstruction feature corresponding to the restored extended residual group; obtain an enhanced reconstruction feature by performing feature enhancement on the image reconstruction feature; and obtain the concatenated auxiliary information by concatenating the auxiliary information with a convolution processing result corresponding to the enhanced reconstruction feature.

In a possible implementation of this embodiment, the residual restoration module 20 is further configured to: acquire a predicted mean, auxiliary information, image residual data, and/or residual data variance corresponding to the restored extended residual group; and obtain the enhanced reconstruction feature by performing feature enhancement on the image reconstruction feature based on the predicted mean, auxiliary information, image residual data, and/or residual data variance corresponding to the restored extended residual group.

In a possible implementation of this embodiment, the data combination module 30 is further configured to: obtain respective enhanced reconstruction features corresponding to the extended residual groups by performing feature enhancement on the respective image reconstruction features corresponding to the extended residual groups; and obtain the reconstructed feature data by performing spatial resolution amplification processing on the respective enhanced reconstruction feature corresponding to the extended residual groups.

In a possible implementation of this embodiment, the image reconstruction module 40 is further configured to: obtain the reconstructed image block by performing synthesis transformation processing on the reconstructed feature data through a pre-constructed synthesis transform network to realize the image reconstruction, where the synthesis transform network is constructed based on deep learning or a neural network.

In a possible implementation of this embodiment, the bitstream decoding module 10 is further configured to: group the extended residual data uniformly according to feature channels corresponding to the extended residual data.

Referring to FIG. 13, FIG. 13 is a structural block diagram of a first embodiment of an image coding apparatus of the present disclosure.

As shown in FIG. 13, the image coding apparatus proposed by an embodiment of the present disclosure includes:

a feature extraction module 100, configured to obtain extended image features by performing spatial resolution reduction processing on an image feature corresponding to a to-be-coded image;

a data grouping module 200, configured to obtain a plurality of extended feature groups by grouping the extended image features;

a residual calculation module 300, configured to obtain respective image residual data corresponding to the extended feature groups by performing residual calculation on each of the plurality of extended feature groups; and a bitstream generation module 400, configured to generate an image bitstream according to the image residual data, and send the image bitstream to an image decoding device.

In this embodiment, extended image features is obtained by performing spatial resolution reduction processing on an image feature corresponding to a to-be-coded image; a plurality of extended feature groups is obtained by grouping the extended image features; respective image residual data corresponding to the extended feature groups is obtained by performing residual calculation on each of the plurality of extended feature groups; and an image bitstream is generated according to the image residual data, and the image bitstream is sent to an image decoding device. By performing spatial resolution reduction processing on the acquired image feature of the to-be-coded image and then grouping it into multiple extended feature groups, residual calculation processing can be performed on entire groups at a lower resolution, thereby improving the overall computational efficiency of residual calculation and reducing time complexity.

In a possible implementation of this embodiment, the feature extraction module 100 is further configured to: acquire the image feature corresponding to the to-be-coded image; obtain the extended image features by performing spatial resolution reduction processing on data in the image feature.

In a possible implementation of this embodiment, the feature extraction module 100 is further configured to:

obtain the extended image features by reducing a spatial size corresponding to the image feature of the to-be-coded image and/or increasing a number of feature channels corresponding to the image feature.

In a possible implementation of this embodiment, the feature extraction module 100 is further configured to: obtain the extended image features by reducing the spatial size corresponding to the image feature and/or increasing the number of feature channels corresponding to the image feature according to spatial information corresponding to the image feature of the to-be-coded image; or, obtain the extended image features by reducing the spatial size corresponding to the image feature and/or increasing the number of feature channels corresponding to the image feature according to frequency domain information corresponding to the image feature of the to-be-coded image; or, obtain the extended image features by reducing the spatial size corresponding to the image feature and/or increasing the number of feature channels corresponding to the image feature according to a preset convolution layer.

In a possible implementation of this embodiment, the residual calculation module 300 is further configured to: construct a residual calculation sequence according to the plurality of extended feature groups; and obtain the respective image residual data corresponding to the extended feature groups by performing residual calculation on each of the plurality of extended feature groups based on the residual calculation sequence.

In a possible implementation of this embodiment, the residual calculation module 300 is further configured to: obtain a current extended feature group by traversing the residual calculation sequence; acquire auxiliary information output by an auxiliary coding network; construct prior information according to the auxiliary information; obtain image residual data corresponding to the current extended feature group by performing residual calculation on the current extended feature group based on the prior information; and obtain the respective image residual data corresponding to the extended feature groups upon a completion of the traversing.

In a possible implementation of this embodiment, the data grouping module 200 is further configured to: obtain the plurality of extended feature groups by grouping the extended image features based on feature channels corresponding to the extended image features.

In a possible implementation of this embodiment, the bitstream generation module 400 is further configured to: obtain image residual data corresponding to the to-be-coded image by performing spatial resolution amplification processing on the image residual data corresponding to the each extended feature group, where the spatial resolution amplification processing is an inverse process of the spatial resolution reduction processing; and generate an image bitstream according to the image residual data corresponding to the to-be-coded image, and send the image bitstream to the image decoding device.

It should be understood that the above is only an example and does not constitute any limitation on the technical solution of the present disclosure. In specific applications, those skilled in the art can make settings according to their needs, and the present disclosure imposes no restrictions in this regard.

It should be noted that the workflow described above is only schematic, and does not limit the scope of protection of the present disclosure. In practical application, those skilled in the art can choose some or all of them to achieve the purpose of the embodiments, and there is no limitation here.

In addition, for technical details that are not described in detail in this embodiment, reference can be made to the image decoding method or image coding method provided in any embodiment of the present disclosure, and will not be repeated here.

In addition, it should be noted that, as used herein, the terms "including", "containing" or any other variations thereof are intended to cover non-exclusive inclusion, so that a process, method, article, or system including a series of elements not only includes those elements, but also includes other elements not explicitly listed or elements inherent to such process, method, article, or system. Without further limitations, an element defined by the phrase "including one" does not exclude the existence of other identical elements in the process, method, object or system including the element.

The serial numbers of the embodiments of the present disclosure mentioned above are solely for descriptive purposes and do not represent the superiority or inferiority of the embodiments.

Through the description of the above embodiments, those skilled in the art can clearly understand that the method according to the above embodiments can be realized by means of software and necessary general hardware platform, and of course it can also be realized by hardware, but in many cases the former is a better embodiment. Based on this understanding, the technical solution of the present disclosure can be embodied in the form of a software product, which is stored in a storage medium (such as a Read Only Memory (ROM)/RAM, magnetic disk and optical disk) and includes several instructions to make a terminal device (which can be a mobile phone, a computer, a server or a network device, etc.) execute the methods described in various embodiments of the present disclosure.

The above are merely preferred embodiments of the present disclosure and do not limit the patent scope of the present disclosure. Any equivalent structural or equivalent process transformations made based on the contents of the specification and accompanying drawings of the present disclosure, or direct or indirect applications in other related technical fields, are similarly included in the patent protection scope of the present disclosure.

The invention claimed is:

1. An image decoding method, comprising:

extracting image residual data or extended residual data from an image bitstream, and obtaining a plurality of extended residual groups based on the extracted image residual data or extended residual data;

obtaining respective image reconstruction features corresponding to the extended residual groups by performing residual restoration on each of the plurality of extended residual groups;

obtaining reconstructed feature data by performing spatial resolution amplification processing on the respective image reconstruction features corresponding to the extended residual groups; and obtaining a reconstructed image block by performing image reconstruction according to the reconstructed feature data;

wherein the obtaining respective image reconstruction features corresponding to the extended residual groups by performing residual restoration on each of the plurality of extended residual groups comprises:

constructing a residual restoration sequence according to the plurality of extended residual groups; and obtaining the respective image reconstruction features corresponding to the extended residual groups by performing residual restoration on each of the plurality of extended residual groups based on the residual restoration sequence.

2. The image decoding method according to claim 1, wherein the extracting image residual data or extended residual data from an image bitstream, and obtaining a plurality of extended residual groups based on the extracted image residual data or the extended residual data comprises:

extracting the image residual data from the image bitstream;

obtaining the extended residual data by performing spatial resolution reduction processing on the image residual data, wherein the spatial resolution amplification processing is an inverse process of the spatial resolution reduction processing; and obtaining the plurality of extended residual groups by grouping the extended residual data.

3. The image decoding method according to claim 2, wherein the obtaining the plurality of extended residual groups by grouping the extended residual data comprises:

grouping the extended residual data uniformly according to feature channels corresponding to the extended residual data.

4. The image decoding method according to claim 2, wherein the obtaining the extended residual data by performing spatial resolution reduction processing on the image residual data comprises:

obtaining the extended residual data by reducing a spatial size corresponding to the image residual data and/or increasing a number of feature channels corresponding to the image residual data.

5. The image decoding method according to claim 4, wherein the obtaining the extended residual data by reducing a spatial size corresponding to the image residual data and/or increasing a number of feature channels corresponding to the image residual data comprises:

obtaining the extended residual data by reducing the spatial size corresponding to the image residual data and/or increasing the number of feature channels corresponding to the image residual data according to spatial information corresponding to the image residual data.

6. The image decoding method according to claim 1, wherein the obtaining the respective image reconstruction features corresponding to the extended residual groups by performing residual restoration on each of the plurality of extended residual groups based on the residual restoration sequence comprises:

obtaining a current extended residual group by traversing the residual restoration sequence;

acquiring auxiliary information output by an auxiliary coding network;

constructing prior information according to the auxiliary information;

obtaining an image reconstruction feature corresponding to the current extended residual group by performing residual restoration on the current extended residual group based on the prior information; and obtaining the respective image reconstruction features corresponding to the extended residual groups upon a completion of the traversing.

7. The image decoding method according to claim 6, wherein the constructing prior information according to the auxiliary information comprises:

obtaining extended auxiliary information;

determining whether the current extended residual group is a first element in the residual restoration sequence;

when the current extended residual group is the first element, constructing the prior information according to the extended auxiliary information; or when the current extended residual group is not the first element, obtaining concatenated auxiliary information by concatenating the extended auxiliary information with a convolution processing result corresponding to an image reconstruction feature of a restored extended residual group, and constructing the prior information based on the concatenated auxiliary information.

8. The image decoding method according to claim 1, wherein the obtaining a reconstructed image block by performing image reconstruction according to the reconstructed feature data comprises:

obtaining the reconstructed image block by performing synthesis transformation processing on the reconstructed feature data through a pre-constructed synthesis transform network to realize the image reconstruction, wherein the synthesis transform network is constructed based on deep learning or a neural network.

9. A decoding device, comprising:

at least one processor;

a memory; and an image decoding program stored in the memory and executable on the at least one processor, wherein the image decoding program, when executed by the at least one processor, causes the at least one processor to;

extract image residual data or extended residual data from an image bitstream, and obtaining a plurality of extended residual groups based on the extracted image residual data or extended residual data:

obtain respective image reconstruction features corresponding to the extended residual groups by performing residual restoration on each of the plurality of extended residual groups;

obtain reconstructed feature data by performing spatial resolution amplification processing on the respective image reconstruction features corresponding to the extended residual groups; and obtain a reconstructed image block by performing image reconstruction according to the reconstructed feature data;

wherein the at least one processor, when obtaining respective image reconstruction features corresponding to the extended residual groups by performing residual restoration on each of the plurality of extended residual groups, is configured to:

construct a residual restoration sequence according to the plurality of extended residual groups; and obtain the respective image reconstruction features corresponding to the extended residual groups by performing residual restoration on each of the plurality of extended residual groups based on the residual restoration sequence.

10. The decoding device according to claim 9, wherein the at least one processor, when extracting image residual data or extended residual data from an image bitstream, and obtaining a plurality of extended residual groups based on the extracted image residual data or the extended residual data, is configured to:

extract the image residual data from the image bitstream;

obtain the extended residual data by performing spatial resolution reduction processing on the image residual data, wherein the spatial resolution amplification processing is an inverse process of the spatial resolution reduction processing; and obtain the plurality of extended residual groups by grouping the extended residual data.

11. The decoding device according to claim 10, wherein the at least one processor, when obtaining the plurality of extended residual groups by grouping the extended residual data is configured to:

group the extended residual data uniformly according to feature channels corresponding to the extended residual data.

12. The decoding device according to claim 10, wherein the at least one processor, when obtaining the extended residual data by performing spatial resolution reduction processing on the image residual data, is configured to:

obtain the extended residual data by reducing a spatial size corresponding to the image residual data and/or increasing a number of feature channels corresponding to the image residual data.

13. The decoding device according to claim 12, wherein the at least one processor, when obtaining the extended residual data by reducing a spatial size corresponding to the image residual data and/or increasing a number of feature channels corresponding to the image residual data, is configured to:

obtain the extended residual data by reducing the spatial size corresponding to the image residual data and/or increasing the number of feature channels corresponding to the image residual data according to spatial information corresponding to the image residual data.

14. The decoding device according to claim 9, wherein the at least one processor, when obtaining the respective image reconstruction features corresponding to the extended residual groups by performing residual restoration on each of the plurality of extended residual groups based on the residual restoration sequence, is configured to:

obtain a current extended residual group by traversing the residual restoration sequence;

acquire auxiliary information output by an auxiliary coding network;

construct prior information according to the auxiliary information;

obtain an image reconstruction feature corresponding to the current extended residual group by performing residual restoration on the current extended residual group based on the prior information; and obtain the respective image reconstruction features corresponding to the extended residual groups upon a completion of the traversing.

15. The decoding device according to claim 14, wherein the at least one processor, when constructing prior information according to the auxiliary information, is configured to:

obtain extended auxiliary information;

determine whether the current extended residual group is a first element in the residual restoration sequence;

when the current extended residual group is the first element, constructing the prior information according to the extended auxiliary information; or when the current extended residual group is not the first element, obtaining concatenated auxiliary information by concatenating the extended auxiliary information with a convolution processing result corresponding to an image reconstruction feature of a restored extended residual group, and constructing the prior information based on the concatenated auxiliary information.

16. The decoding device according to claim 9, wherein the at least one processor, when obtaining a reconstructed image block by performing image reconstruction according to the reconstructed feature data, is configured to:

obtain the reconstructed image block by performing synthesis transformation processing on the reconstructed feature data through a pre-constructed synthesis transform network to realize the image reconstruction, wherein the synthesis transform network is constructed based on deep learning or a neural network.

17. A non-transitory storage medium, wherein an image decoding program is stored on the non-transitory storage medium, wherein the image decoding program cause at least one processor to:

extract image residual data or extended residual data from an image bitstream, and obtaining a plurality of extended residual groups based on the extracted image residual data or extended residual data:

obtain respective image reconstruction features corresponding to the extended residual groups by performing residual restoration on each of the plurality of extended residual groups;

obtain reconstructed feature data by performing spatial resolution amplification processing on the respective image reconstruction features corresponding to the extended residual groups; and obtain a reconstructed image block by performing image reconstruction according to the reconstructed feature data;

wherein the at least one processor, when obtaining respective image reconstruction features corresponding to the extended residual groups by performing residual restoration on each of the plurality of extended residual groups, is configured to:

construct a residual restoration sequence according to the plurality of extended residual groups; and obtain the respective image reconstruction features corresponding to the extended residual groups by performing residual restoration on each of the plurality of extended residual groups based on the residual restoration sequence.

* * * * *